(12) United States Patent
Patrick et al.

(10) Patent No.: US 9,957,046 B2
(45) Date of Patent: *May 1, 2018

(54) MECHANISMS FOR LOWERING A PAYLOAD TO THE GROUND FROM A UAV

(71) Applicant: X Development LLC, Mountain View, CA (US)

(72) Inventors: William Graham Patrick, Palo Alto, CA (US); James Ryan Burgess, Redwood City, CA (US); Andrew Conrad, Malibu, CA (US)

(73) Assignee: X Development LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/711,758

(22) Filed: Sep. 21, 2017

(65) Prior Publication Data

US 2018/0022456 A1    Jan. 25, 2018

Related U.S. Application Data

(60) Continuation of application No. 15/147,766, filed on May 5, 2016, now Pat. No. 9,783,297, which is a
(Continued)

(51) Int. Cl.
*B64D 1/12* (2006.01)
*B64D 1/22* (2006.01)
*B64C 39/02* (2006.01)

(52) U.S. Cl.
CPC .............. *B64D 1/12* (2013.01); *B64C 39/024* (2013.01); *B64D 1/22* (2013.01);
(Continued)

(58) Field of Classification Search
CPC ............ B64C 39/024; B64C 2201/128; B64C 2201/14; B64C 2201/141;
(Continued)

(56) References Cited

U.S. PATENT DOCUMENTS 5,014,997 A    5/1991   Smith et al.
5,722,618 A    3/1998   Jacobs et al.
(Continued)

FOREIGN PATENT DOCUMENTS

CN           2723242       9/2005
CN          201313633      9/2009
(Continued)

*Primary Examiner* — Brian M O'Hara
(74) *Attorney, Agent, or Firm* — McDonnell Boehnen Hulbert & Berghoff LLP; Michael Clifford

(57) ABSTRACT

Embodiments described herein may help to provide medical support via a fleet of unmanned aerial vehicles (UAVs). An illustrative UAV may include a housing, a payload, a line-deployment mechanism coupled to the housing and a line, and a payload-release mechanism that couples the line to the payload, wherein the payload-release mechanism is configured to release the payload from the line. The UAV may further include a control system configured to determine that the UAV is located at or near a delivery location and responsively: operate the line-deployment mechanism according to a variable deployment-rate profile to lower the payload to or near to the ground, determine that the payload is touching or is within a threshold distance from the ground, and responsively operate the payload-release mechanism to release the payload from the line.

20 Claims, 11 Drawing Sheets

Related U.S. Application Data division of application No. 13/975,590, filed on Aug. 26, 2013, now Pat. No. 9,346,547.

(52) U.S. Cl.
CPC .. *B64C 2201/128* (2013.01); *B64C 2201/141* (2013.01); *B64C 2201/145* (2013.01)

(58) Field of Classification Search
CPC ........ B64C 2201/145; B64C 2201/146; B64C 27/006; B64D 1/00; B64D 1/02; B64D 1/22

See application file for complete search history.

(56) References Cited

U.S. PATENT DOCUMENTS

| | | |
|---|---|---|
| 2004/0084567 A1 | 5/2004 | Bailey |
| 2005/0230555 A1 | 10/2005 | Strong |
| 2007/0200032 A1 | 8/2007 | Eadie et al. |
| 2009/0009596 A1 | 1/2009 | Kerr et al. |
| 2009/0146010 A1 | 6/2009 | Cohen |
| 2009/0314886 A1 | 12/2009 | Clancy et al. |
| 2010/0044156 A1 | 2/2010 | Tkebuchava |
| 2012/0091261 A1 | 4/2012 | Lee |
| 2013/0054054 A1 | 2/2013 | Tollenaere et al. |
| 2014/0263852 A1 | 9/2014 | Walker et al. |

FOREIGN PATENT DOCUMENTS

| | | |
|---|---|---|
| CN | 101823559 | 9/2010 |
| CN | 201604798 | 10/2010 |
| CN | 103072692 | 5/2013 |
| WO | 2012006158 | 1/2012 |

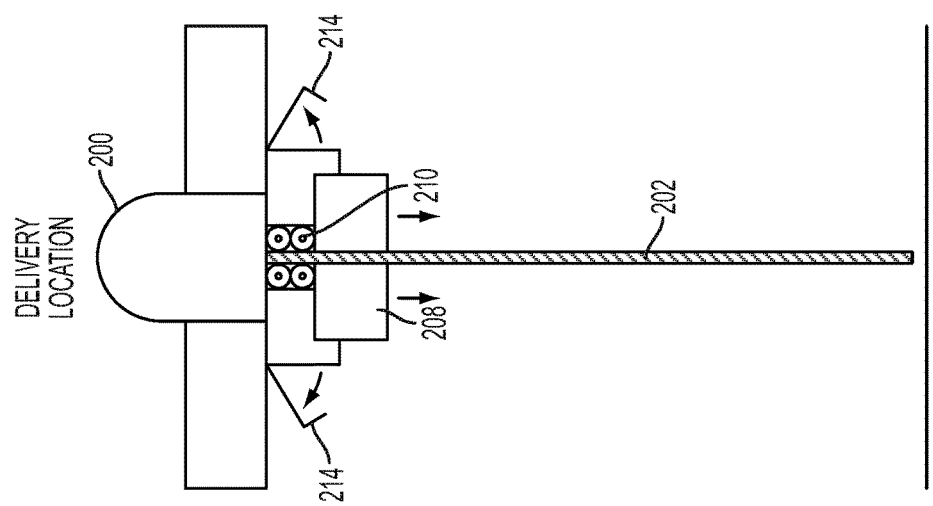
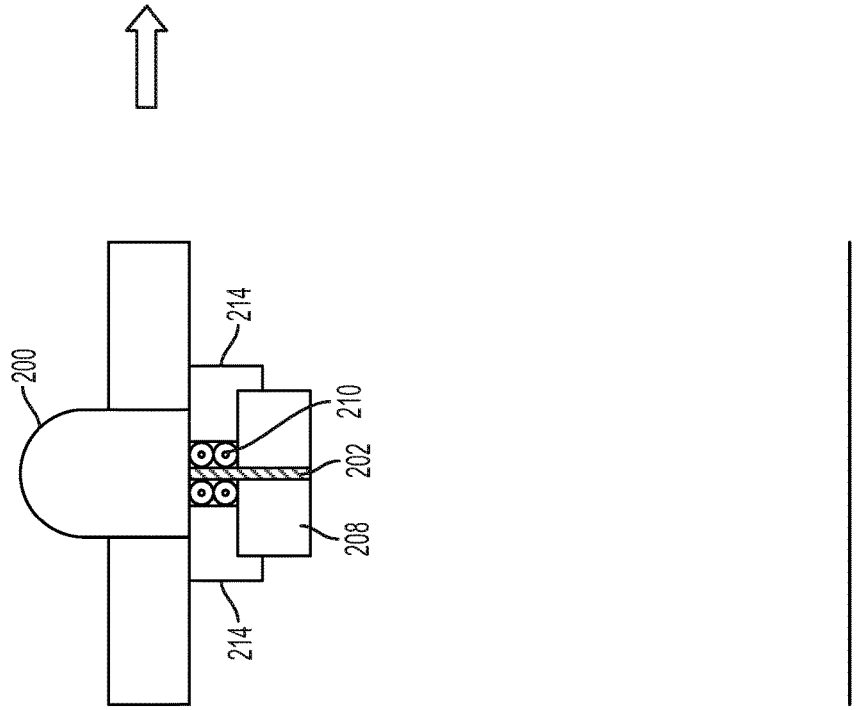

MECHANISMS FOR LOWERING A PAYLOAD TO THE GROUND FROM A UAV

CROSS REFERENCE TO RELATED APPLICATIONS

This application is a continuation of U.S. patent application Ser. No. 15/147,766, filed on May 5, 2016, now pending, which is a divisional of U.S. patent application Ser. No. 13/975,590, filed Aug. 26, 2013, both of which are incorporated by reference herein in their entirety and for all purposes.

BACKGROUND

Unless otherwise indicated herein, the materials described in this section are not prior art to the claims in this application and are not admitted to be prior art by inclusion in this section.

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Example embodiments may relate to or take the form of systems and methods that help to lower a payload from a hovering UAV to the ground below. In particular, example systems and methods may help to safely lower medical devices and/or supplies from a UAV that is hovering above the scene of a medical situation. In an example embodiment, a UAV may include a winch system that is controllable to vary the rate at which a payload on a line is lowered towards the ground. The UAV may further include a control system that is configured to determine and deploy the payload according to a variable deployment-rate plan that is tailored to the particular environment and/or the particular situation in which the payload is being deployed from the UAV.

In one aspect, an example UAV may include: (a) a housing, (b) a payload, (c) a line-deployment mechanism coupled to the housing and a line, wherein the line-deployment mechanism is controllable to vary a deployment rate of the line, (d) a payload-release mechanism that couples the line to the payload, wherein the payload-release mechanism is configured to release the payload from the line, and (e) a control system configured to determine that the UAV is located at or near a delivery location and responsively: (i) operate the line-deployment mechanism according to a variable deployment-rate profile to lower the payload to or near to the ground, wherein the variable deployment-rate profile is such that the rate at which the line is deployed varies while the payload is being lowered to the ground, (ii) determine that the payload is touching or is within a threshold distance from the ground, and (iii) responsively operate the payload-release mechanism to release the payload from the line.

In another aspect, an example method may involve: (a) determining, by a computing system, a variable deployment-rate profile for deployment of a payload from an unmanned aerial vehicle (UAV), wherein a line couples the payload to the UAV, (b) the computing system causing a line-deployment mechanism to operate according to the determined variable deployment-rate profile to lower the payload towards the ground, wherein the variable deployment-rate profile is such that the deployment rate of the line varies while the payload is being lowered to the ground, (c) detecting, by the computing system, at least one release indication that indicates that the payload is at or near to the ground, and (d) in response to detecting the at least one release indication, the computing system causing the payload to be released from the line.

In a further aspect, an example non-transitory computer readable medium may have stored therein instructions executable by a computing device to cause the computing device to perform functions comprising: (a) determining a variable deployment-rate profile for deployment of a payload from an unmanned aerial vehicle (UAV), wherein a line couples the payload to the UAV, (b) causing a line-deployment mechanism to operate according to the determined variable deployment-rate profile to lower the payload towards the ground, wherein the variable deployment-rate profile is such that the deployment rate of the line varies while the payload is being lowered to the ground, (c) detecting at least one release indication that indicates that the payload is at or near to the ground; and (d) in response to detecting the at least one release indication, causing the payload to be released from the line.

an exemplary computer-implemented method may involve a computing device: (a) identifying a remote medical situation; (b) determining a target location corresponding to the medical situation; (c) selecting an unmanned aerial vehicle (UAV) from a plurality of UAVs, wherein the plurality of UAVs are configured to provide medical support for a plurality of medical situations, and wherein the selection of the UAV is based at least in part on a determination that the selected UAV is configured for the identified medical situation; and (d) causing the selected UAV to travel to the target location to provide medical support.

In yet another aspect, an example system may include: (a) means for determining a variable deployment-rate profile for deployment of a payload from an unmanned aerial vehicle (UAV), wherein a line couples the payload to the UAV, (b) means for causing a line-deployment mechanism to operate according to the determined variable deployment-rate profile to lower the payload towards the ground, wherein the variable deployment-rate profile is such that the deployment rate of the line varies while the payload is being lowered to the ground, (c) means for detecting at least one release indication that indicates that the payload is at or near to the ground, and (d) means for, in response to detecting the at least one release indication, causing the payload to be released from the line.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIGS. 2A, 2B, and 2C show another UAV that includes a payload delivery system, according to an example embodiment.

DETAILED DESCRIPTION

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems and methods can be arranged and combined in a wide variety of different configurations, all of which are contemplated herein.

I. Overview

Example embodiments may relate to and/or be implemented in a system in which unmanned vehicles, and in particular, "unmanned aerial vehicles" (UAVs), are configured to provide medical support. In particular, a network of UAVs may be distributed amongst a number of launch sites, from which UAVs may be deployed to deliver medical-support items to remote locations. In some cases, landing a UAV at the location on the ground where medical support is needed may be difficult or undesirable for other reasons. Thus, it may be desirable for a UAV to fly to a location above a person in need of medical support, and deliver a medical support item from the air.

Accordingly, example embodiments may provide a winch system or another mechanism for lowering a payload with a medical-support item from a hovering UAV to a desired ground location in a controllable manner. More specifically, an illustrative UAV or remote control system for a UAV may determine a variable deployment-rate plan (VDRP) for letting out a line with an attached payload. The VDRP may specify two or more rates at which the line should be let out (and thus two or more descent rates for the payload), along with timing information for implementing the specified rates. Note that in some embodiments, the rate at which a winch lets out a line may be varied via a controllable brake (e.g., a magnetic brake), which is configured to apply a variable amount of friction to the line. However, other configurations for controlling the rate at which a line lowers a payload to the ground are also possible.

II. Systems for Lowering Payload from Hovering UAV to Ground

Figure 1A:
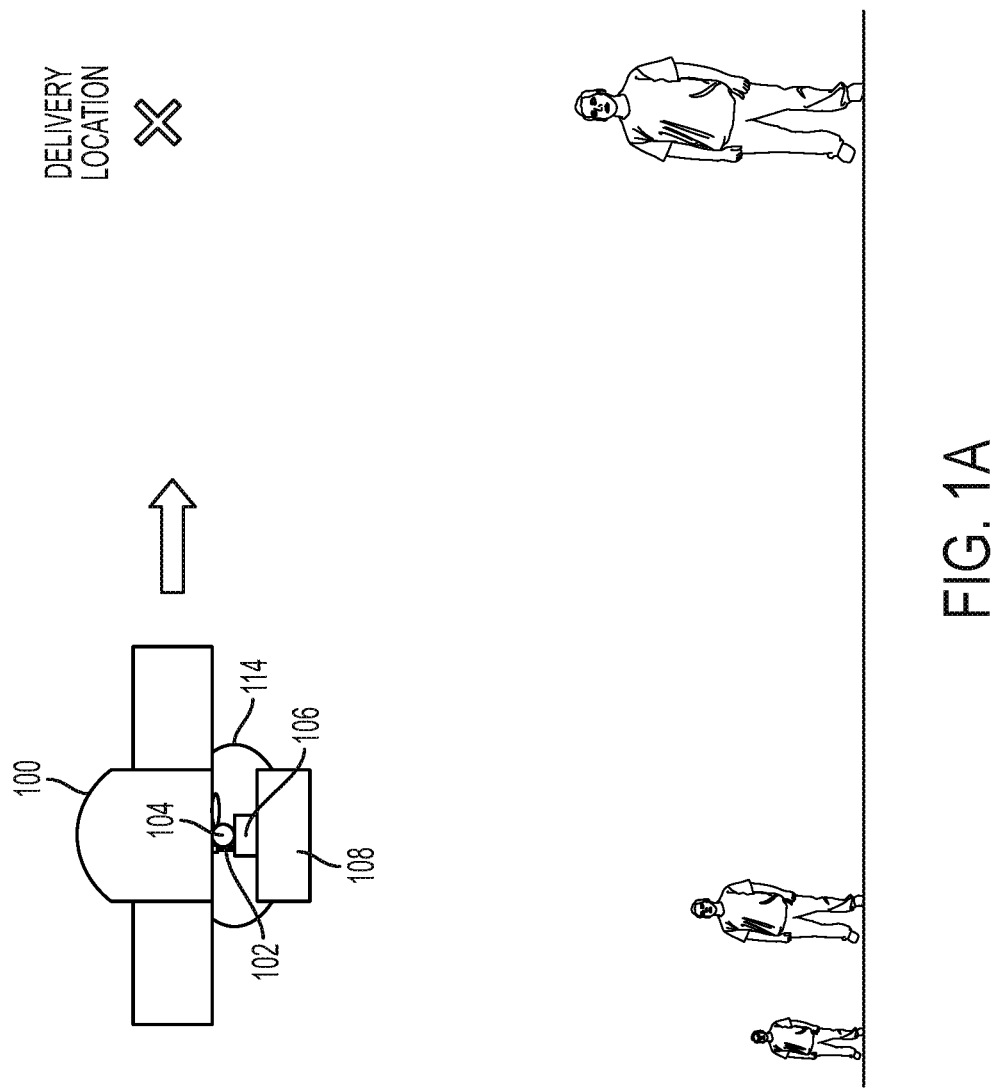
FIGS. 1A and 1B show a UAV that includes a payload delivery system, according to an example embodiment.
Figure 1B:
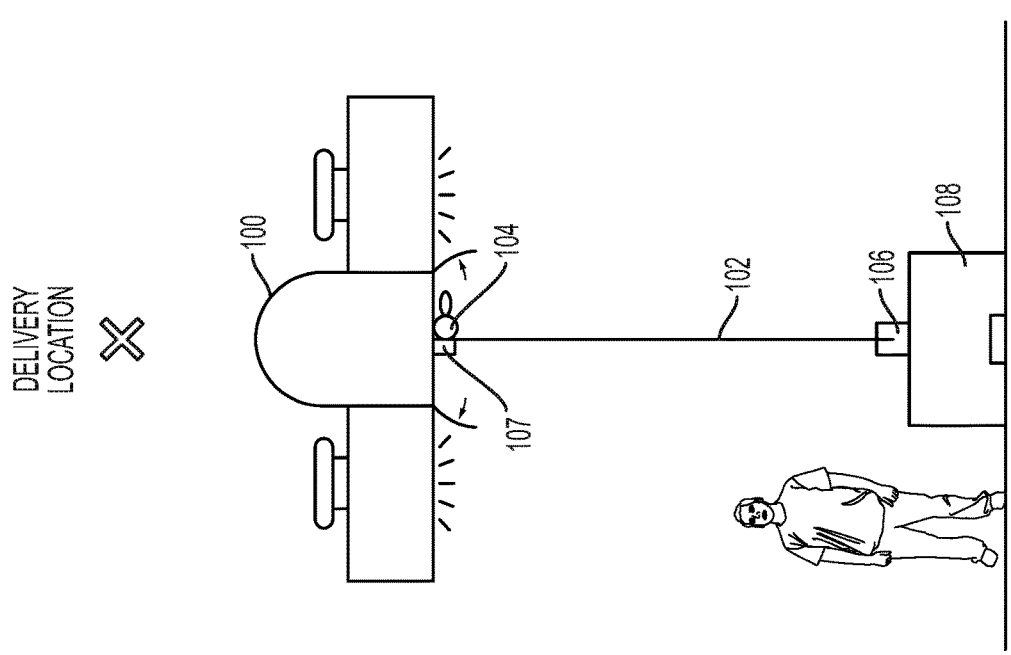

FIGS. 1A and 1B show a UAV 100 that includes a payload delivery system, according to an example embodiment. As shown, payload delivery system for UAV 100 includes a line 102, a line-deployment mechanism 104, a payload-release mechanism 106, and a payload 108. The payload 108 may itself be a medical-support item, such as a defibrillator or a medicine container, or may be a container that holds a medical-support item, such as a general purpose basket-style container into which a medical-support item can be placed. In either case, the payload delivery system of UAV 100 may be operable to autonomously lower payload 108 to the ground in a controlled manner.

More specifically, as shown in FIG. 1A, the UAV may be operable to hold the payload 108 against or close to the bottom of the UAV, or possibly even inside of the UAV 100, during flight from a launch site to the delivery location. Then, when the UAV 100 reaches the delivery location, the UAV's control system may operate the line-deployment mechanism 104 such that the payload 108 is lowered to the ground, as shown in FIG. 1B.

The UAV may accordingly include features that can hold the payload in place and/or stabilize the payload during flight. Such features may be moveable such that the line-deployment mechanism 108 can lower the payload upon arriving at the delivery location. For instance, in the configuration shown in FIGS. 1A, UAV 100 includes moveable brackets 114. Brackets 114 may hold payload 108 in place during flight, as shown in FIG. 1A. When UAV 100 reaches the delivery location, brackets 114 may be removed from payload 108, so that the payload can be lowered towards the ground. Note that other types of mechanisms may also be used to hold the payload in place and/or to stabilize the payload during flight. Alternatively, the payload may simply be held in place during flight by the line, without use of any additional features.

In an example embodiment further aspect, when the control system detects that the payload has been lowered to a point where it is at or near the ground, the control system may responsively operate the payload-release mechanism 106 to detach the payload from the line. As such, the UAV's control system may use various types of data, and various techniques, to determine when the payload is at or near the ground. Further, the data that is used to determine when the payload is at or near the ground may be provided by sensors on UAV 100, sensors on the line 102, sensors on the payload 108, and/or other data sources.

A. Line-Deployment Mechanism

In an example embodiment, the line-deployment mechanism may include or take the form of a winch that is configured to deploy a line with a payload attached thereto. The winch may include a motor (e.g., a DC motor) that can be actively controlled by a servomechanism (also referred to as a "servo") and a microcontroller. The microcontroller may output a desired operating rate (e.g., a desired RPM) for the winch, which may correspond to the speed at which the line and payload should be lowered towards the ground. The servo may then control the winch so that it maintains the desired operating rate.

In a further aspect, the line-deployment mechanism 104 may vary the rate at which the line and payload are lowered to the ground. For example, a microcontroller may change the desired operating rate according to a variable deployment-rate profile and/or in response to other factors in order to change the rate at which the payload descends towards the ground. To do so, the line-deployment mechanism 104 may adjust the amount of braking or the amount of friction that is applied to the line. For example, to vary the line deployment rate, the line-deployment mechanism 104 may include friction pads that can apply a variable amount of pressure to the line. As another example, a line-deployment mechanism 104 can include a motorized braking system that varies the rate at which a wheel lets out the line. Such a braking system may take the form of an electromechanical system in which motor operates to slow the rate at which a spool lets out the line. Further, the motor may vary amount by which it adjusts the speed (e.g., the RPM) of the spool, and thus may vary the deployment rate of the line. Other examples are also possible.

In some embodiments, the line-deployment mechanism may be attached to the payload, instead of being attached to the UAV housing. For example, a winch could be attached to the top of the payload. In such an embodiment, the winch may be operable to hold the payload at or near the bottom of the UAV housing during flight to a delivery location. Further, upon arriving at the delivery location, the winch may be operable to lower the payload by releasing the line and/or using a brake to adjust the rate at which the line is released, according to a VDRP. Further, it is contemplated that other types of line-deployment mechanisms may also be attached to the payload.

B. Payload-Release Mechanism

In some embodiments, the payload 108 and/or payload-release mechanism 106 may be designed with features that help to prevent the payload 108 and/or the payload-release mechanism 106 from getting stuck or caught during descent (e.g., to prevent getting caught and/or tangled in a tree or on a power line). For instance, the payload 108 and/or payload-release mechanism 106 may take the form of or be housed in a teardrop-shaped component, or another shape that can be more easily moved up and down without getting stuck.

Various other types of payload-release mechanisms are possible, depending on the particular implementation. For example, a UAV could include a payload-release mechanism that is positioned on the line or at the top of the line, which is operable to cut the line or release the line from UAV when the payload is at or near the ground. Other examples are also possible.

Further, in some embodiments, there may be no payload-release mechanism. For example, the payload could be attached to a rolling mechanism that, once released, simply rolls off the end of the line, as shown in FIGS. 2A to 2C.

Figure 2C:
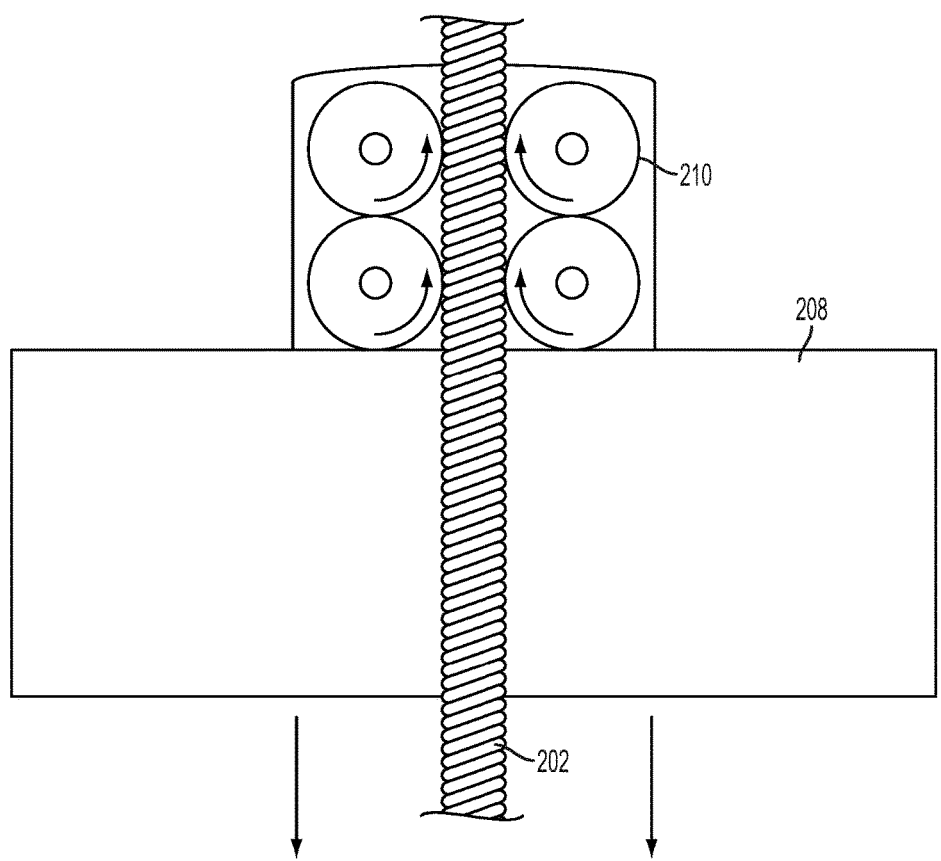

More specifically, FIG. 2A shows a UAV 200 with a payload 208 that includes a wheel mechanism 210. During flight to a delivery location, the payload 208 may be held in place a line-deployment mechanism, which in this case may be retractable features 214. When the UAV arrives at the delivery location, the line 202 may be deployed, and the retractable features 214 may then be retracted such that the payload descends along the line 102. (Note that there may be a mechanism, which is not shown in FIGS. 2A to 2C, for retracting or otherwise holding the line itself near the UAV during flight, and then releasing and/or lowering the line upon reaching the delivery location.) The wheels of the wheel mechanism 210 may be configured to pinch the line and thus limit the descent rate of the payload. The pressure exerted by the wheels on the line may be variable and controllable so as to vary the descent rate according to a VDRP.

C. Control System

In an example embodiment, a UAV 100 may include a control system to provide various functions described herein. The control system may include or take the form of program instructions stored in a non-transitory computer-readable medium.

The control system may be configured to determine a variable deployment-rate profile, which indicates the timing with which to increase and/or decrease the deployment rate of the line 102, and thus the descent rate of the payload 108, as the payload is being lowered to the ground. For instance, in some cases, a variable deployment-rate profile may be such that the payload starts descending at a higher speed, and gradually decreases in speed as the payload approaches the ground. In other cases, a variable deployment-rate profile may indicate more discrete adjustments to friction (e.g., braking adjustments) and thus to descent rate. For example, a variable deployment-rate profile may cause the payload to descent at a constant, higher speed, until the payload is within a certain distance from the ground (e.g., 5 or 10 feet), at which point, the friction may increase significantly in order to reduce the descent rate. Other examples are also possible.

In a further aspect, a control system of UAV 100 may intelligently control the payload-release mechanism 106 to release the payload 108 at or near the ground. For example, a control system may trigger the payload-release mechanism 106 after a certain length of line has been let out, such that it is expected that the payload 108 is on the ground, or near enough to the ground that it can safely drop to the ground. Other examples are also possible.

Note that the timing with which a control system determines a VDRP may vary. In some embodiments, the VDRP for a particular deployment may be determined before the UAV is launched and travels to a delivery location. In other embodiments, the VDRP for a particular deployment may be determined or updated while the UAV is traveling from a launch site to the delivery location.

In yet other embodiments, the VDRP for a particular deployment may be determined or updated when the UAV arrives or is about to arrive at the delivery location. For example, when a UAV determines that it is located over a geographic location where its payload should be deployed (i.e., the "delivery location"), the UAV may responsively determine a VDRP for lowering the payload to the ground at that particular delivery location. The VDRP may accordingly take into account characteristics of the environment at that particular delivery location and/or other factors that are potentially unique to delivery of the current payload, at that particular delivery location, at the specific time the payload is being delivered.

To facilitate implementation of a VDRP, a UAV 100 may include a system for determining the amount (e.g., the length) of the line that has been let out by the line-deployment mechanism 104. For example, the line length may be determined based on a counter, which counts the rotations of a motor that turns a winch in the line-deployment mechanism 104. Since the amount of line that has been let out may be proportional to the number of rotations of the winch, the length of the line that has been let by the winch may be calculated based on the number of rotations of motor that powers the winch.

The length of line 102 that has been let out may then be used to determine the distance between the payload 108 and the ground. More specifically, given the height of the payload itself, the height of the payload-release mechanism (if any), the length of the line 102, and the altitude difference between the top of the line 102 and the point where altitude is measured by the UAV 100 (if any), the UAV 100 may determine the distance between the bottom of the payload 108 and the ground. Thus, the distance between the payload 108 and the ground can be updated as the line 102 is deployed to, e.g., determine when to change the deployment rate of line 102 in accordance with a given VDRP.

D. Emergency-Release System

In yet a further aspect, a UAV 100 may include an emergency system (not shown in the Figures), which is configured to cut or release the line. In particular, the UAV 100 may be configured to detect certain emergency situations, such the line 102 and/or payload getting stuck (e.g., in a tree), and to automatically cut the line when such an emergency situation is detected.

Various types of emergency-release mechanisms are possible, which may be configured to cut the line holding the payload or otherwise release the line from the UAV. Alternatively, an emergency-release mechanism could cut or mechanically release the payload from the line.

Further, various types of data may be analyzed to determine if and when an emergency-release mechanism should be used to release the payload. For example, a UAV control system could analyzed image data from a camera, data from a line-tension sensor, and/or other types of data to determine that the payload is stuck or that deployment of the payload has otherwise failed, and responsively use the emergency-release mechanism to release the payload.

E. Illustrative Payloads

In some embodiments, the payload may take the form of a container that includes medical-support devices and/or other items intended to help in a medical situation. In other embodiments, the payload may itself be a medical-support device (e.g., a defibrillator) or another type of medical support item, (e.g., a first-aid kit or medicine). Illustrative embodiments may also include or be implemented in conjunction with other types of medical and/or non-medical payloads.

When the payload 108 includes powered components (e.g., sensors, communications systems, and/or medical-support devices), the payload may include a power source. In some embodiments, the payload 108 could include a capacitive power source that charges from a power source on the housing of the UAV 100. The capacitive power source on the payload may be configured such when held in a retained position, as in FIG. 1A, the capacitive power source touches contacts on the UAV housing and thus is charged by a power source in the housing of the UAV 100. The capacitive power source may store enough energy to power the payload 108 for, e.g., two to three minutes after it is separated from the housing and begins the descent towards the ground.

F. Communication Systems Between the Payload and the UAV

In some embodiments, the UAV 100 may be configured to communicate with payload 108 in order to send data to and/or receive data from sensors and/or systems on the payload 108. In particular, a control system or systems in the main housing of the UAV 100 may communicate with (or possibly just receive data from) sensors and/or systems that are mounted to or integrated in the payload 108. For example, data from sensors on the payload may provide feedback as to the state of the payload while it is being deployed and/or be utilized to determine when the payload has reached the ground and/or is near to the ground or another object. Other examples are also possible.

In such an embodiment, the payload 108 and the housing of UAV 100 may both have wireless communication interfaces for wireless communications between the payload and the UAV housing. Alternatively, wiring could be included in an example system for wired communications between the UAV housing and the payload. Further, in some embodiments, wiring for communications between the payload and the UAV may be enclosed in the line 102 that is used to lower the payload 108 to the ground.

G Other Aspects

In some embodiments, a UAV may additionally or alternatively be configured to pick up items from the ground using a similar system to that shown in FIGS. 1A and 1B, or a different type of system. In such an embodiment, a variable retraction-rate profile may be varied in order to vary the rate at which the line is retracted to lift a payload from the ground towards the housing of the UAV, while the UAV is hovering.

III. Methods for Determining a Variable Deployment-Rate Profile

Figure 3:
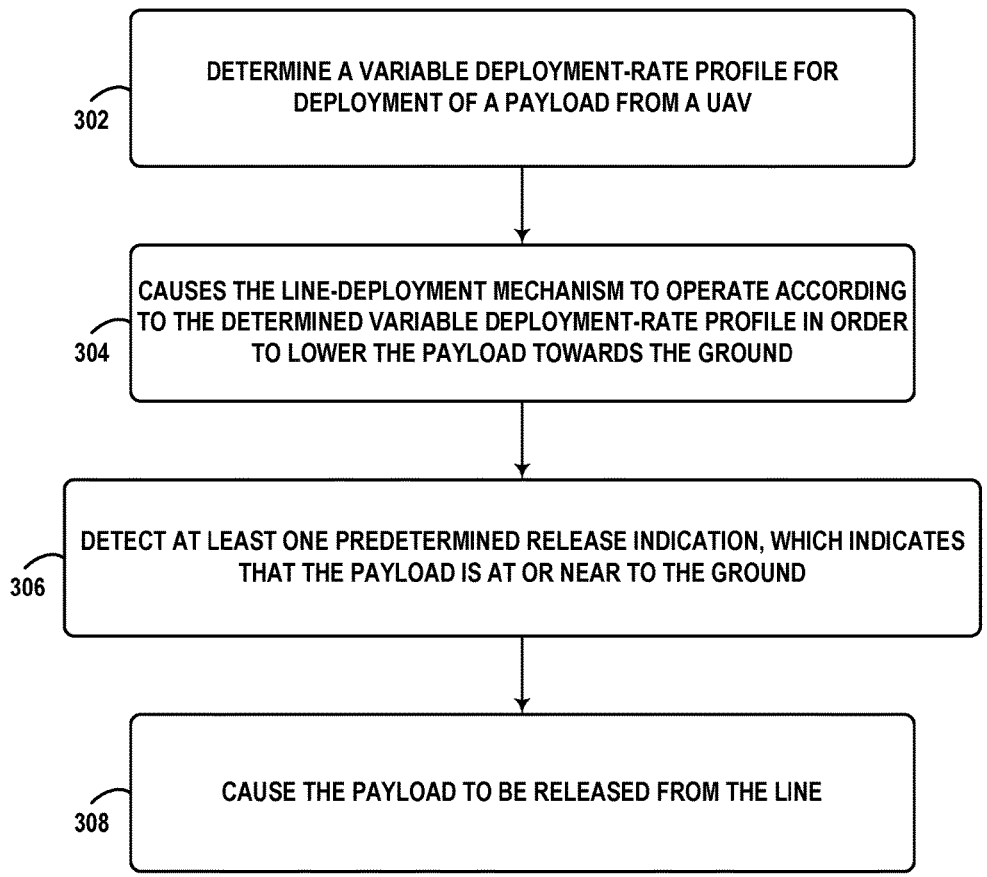
FIG. 3 is a flow chart illustrating a method 300, according to an example embodiment.

As noted above, a UAV 100 may include a control system that is operable to determine a variable deployment-rate profile, which may be used to deploy a line with an attached payload from a hovering UAV. FIG. 3 is a flow chart illustrating a method 300, according to an example embodiment. In particular, method 300 may be implemented by a computing system of a UAV in order to determine a variable deployment-rate profile and use the variable deployment-rate profile to deliver a payload while hovering above the delivery location.

More specifically, as shown by block 302, method 300 involves a computing system determining a variable deployment-rate profile for deployment of a payload from a UAV, where a line couples the payload to the UAV and is deployable to lower the payload towards the ground. At block 304, the computing system causes the line-deployment mechanism to operate according to the determined variable deployment-rate profile in order to lower the payload towards the ground. Then, at block 306, the computing system detects at least one predetermined release indication, which indicates that the payload is at or near to the ground. In response to detecting the at least one release indication, the computing system causes the payload to be released from the line (e.g., by operating a payload-release mechanism such as payload-release mechanism 106), as shown by block 308.

Note that the functions of method 300 and other functions may be described herein as being performed by a UAV in order to simplify the disclosure. It should be understood that such functions may be carried out by, e.g., a computing system or systems of a UAV, such as by the UAV control system described with respect to UAV 100. Other UAV systems and/or sensors may also be utilized in an example method.

Further, while method 300 is described by way of example as being carried out by a UAV, method 300 or portions thereof may in fact be carried out at a system that is separate from and in communication with a UAV, without departing from the scope of the invention. For example, a UAV control center at a remote location could determine a VDRP for a UAV, and communicate the determined VDRP to the UAV via a wireless communications link. Other examples are also possible.

A. Determining the Variable Deployment-Rate Profile

In an example embodiment, the UAV 100 may dynamically determine the variable deployment-rate profile that should be used for the particular situation in which the UAV is lowering its payload towards the ground. For example, the UAV may determine the variable deployment-rate profile based on factors such as: (a) the UAV's altitude, (b) wind conditions, (c) environmental factors (e.g., trees, power lines, etc.), and/or (d) payload characteristics (size, shape, weight, fragility of contents, etc.), among other possibilities.

For example, a UAV 100 may determine the height at which it is hovering above the ground, and adjust a variable deployment-rate profile accordingly. For example, a UAV may be configured to lower the payload at a first rate until the payload is 10 feet above the ground, and to reduce the speed at which the payload is lowered to a second rate at 10 feet. As a specific example, the first rate may be 5.0 ft/sec and the second rate may be 1.0 ft/sec. Accordingly, if the UAV is hovering at 34 feet, the UAV may create a variable deployment-rate profile that specifies that the line-deployment mechanism 104 should initially let out the line 102 at a rate of 5.0 ft/sec, and reduce the deployment rate of the line to 1.0 ft/sec when 24 feet of line have been let out.

Note that to implement the above-described variable deployment-rate profile, where the deployment rate switches to 1.0 ft/sec at 10 feet above the ground, the line-deployment mechanism 104 may begin reducing the deployment rate (e.g., by braking) before the payload is 10 feet above the ground, such that the deployment rate of the line is 1.0 ft/sec when the payload is 10 feet above the ground (e.g., when the UAV is hovering at 34 feet and 24 feet of line have been let out). Alternatively, the line-deployment mechanism 104 may begin reducing the deployment rate when the payload 10 feet above the ground. In such an embodiment, the deployment rate of the line when the payload 10 feet above the ground may greater than 1.0 ft/sec, but will be reduced to this rate shortly thereafter.

In the above examples, the variable deployment-rate profile specified discrete adjustments to the descent rate at particular lengths (e.g., lengths of the line that corresponds to particular distances between the payload and the ground). Note that while the above examples included only two deployment rates (e.g., an initial rate and a second, lower rate when the payload is nearing the ground), more granular variable deployment-rate profiles, which specify more than two deployment rates, are also possible.

Further, a UAV may also generate a variable deployment-rate profile that specifies a function for continuously changing the deployment rate, for at least a portion of the payload delivery process. For example, the UAV may determine a linear reduction from a first deployment rate to a second deployment rate, which typically is lower than the first deployment rate. In particular, the UAV may determine its hovering height, and then determine a linear rate at which to reduce the deployment rate from the first deployment rate, such that the second deployment rate is achieved when the payload is at a target distance from the ground. Other examples are also possible.

As noted above, in some embodiments, a UAV may vary the VDRP based on weather conditions at the delivery location. For instance, a UAV may adjust the VDRP based on the wind at the delivery location. As an example, if the wind is stronger, the UAV may increase the deployment rate at some or all stages of deployment, in an effort to reduce the effect of the wind on the payload as it is being lowered.

Further, weather conditions such as the wind may be considered in combination with other factors. For instance, the UAV may consider the weight and/or structure of the payload in combination with the wind and/or other factors. To illustrate, if the UAV is lowering a payload that is heavier and/or has a structure that is less susceptible to being moved by the wind, the UAV may make lesser increases in deployment rate at a given wind speed, than it would for a payload that is lighter and/or has a structure that is more susceptible to being moved by the wind. Other examples are also possible.

In a further aspect, the UAV 100 may be configured to move vertically (i.e., change altitude) in order to control the descent of the payload. As such, the VDRP determined at block 302 may include timing information indicating when the UAV should change altitude, during deployment of the payload. For example, the VDRP may indicate a specific time at which the UAV should change altitude, or a line length or height from the ground at which the UAV should change altitude. Further, the VDRP may indicate the speed, and possibly the acceleration, with which to implement a change altitude.

As a specific example, when the payload 108 is nearing the ground, UAV 100 could move upward while the line 102 is let out at a constant rate, in order to cushion the landing of payload 108. To facilitate such vertical movement of the UAV during payload delivery, the VDRP may indicate a line length (or distance from the payload to the ground) at which the UAV 100 should begin moving vertically to a new altitude. For example, in an effort to soften the landing of the payload on the ground, a VDRP might indicate that the UAV should increase its altitude at a rate of 0.5 ft/sec when the payload is 1.0 feet from the ground, until its altitude is 0.75 feet higher. Other examples are also possible.

In a further aspect, a given variable deployment-rate profile may have an associated height at which the UAV should hover while lowering the payload (or an associated height range in which the UAV should remain while lowering the payload). The desired hovering height or height range may be predetermined, or may be dynamically determined by the UAV when it arrives at the delivery location (e.g., as part of carrying out block 302). The desired hovering height may be determined based on various factors.

For example, the length of line may factor into setting the desired hovering height for delivery of a payload according to a given variable deployment-rate profile (e.g., the UAV should not hover above a height where the line cannot lower the payload to, or at least within a safe drop distance from, the ground). The UAV or another entity may also take into account weather conditions at the delivery location when determining the desired hovering height for a variable deployment-rate profile. For instance, the UAV may attempt to hover at a lower height when there are higher winds, in an effort to reduce the effect of the wind on the line and payload as the payload is being lowered. The UAV may also take its surrounding environment into account, e.g., and adjust its hovering height in an effort to prevent the payload from colliding with objects (e.g., trees, people, cars, buildings, power lines, etc.) as the payload is being lowered from the UAV.

In a further aspect, a UAV 100 may proactively determine movements that offsets, prevents, or otherwise reduce pendulum-like movement of the payload as the payload is being lowered to the ground. For example, when payload 108 is lowered via a line 102, the payload may act as a pendulum hanging from the UAV, and thus may have a tendency to swing back and forth thru an arc due to wind and/or horizontal movement of the UAV, for instance. Therefore, when determining the VDRP, the UAV 100 may take into account data such as the current wind conditions and/or the weight distribution of the contents of the payload 108 in order to proactively determine horizontal movements that offset the expected horizontal forces on the payload. As such, the determined VDRP may indicate horizontal movements and timing for such movements, which is expected to offset the expected horizontal forces on the payload and prevent or dampen the oscillation of the payload 108 on the line 102. Additionally or alternatively, the UAV 100 may observe oscillation of the payload 108 while it is being lowered, and dynamically respond by moving horizontally to dampen the oscillation.

C. Adjusting or Deviating From the Variable Deployment-Rate Profile

In some embodiments, a UAV 100 may dynamically adjust or deviate from the variable deployment-rate profile while in the midst of lowering the payload towards the ground. Specifically, a UAV 100 may evaluate new information that is acquired while lowering the payload towards the ground in order to determine whether to adjust or deviate from the VDRP.

For example, when determining a variable deployment-rate profile, the UAV may determine a certain amount of braking to apply to the line in order to achieve a particular descent rate at a particular height. This determination may be based on certain assumptions or observations about the environment at the time the VDRP is generated. However, while lowering the payload according to the VDRP, the UAV may detect environmental changes (e.g., a person walking into the landing area), which make a lower or higher descent rate at the particular height desirable. Additionally or alternatively, the UAV may detect a change in circumstances such that the determined amount of braking will no longer achieve a descent rate that is desired at the certain height. When such changes are detected mid-descent, the UAV may responsively adjust the VDRP, or deviate from the predetermined variable deployment-rate profile.

In a further aspect, a UAV 100 may reactively move in a manner that offsets, prevents, or reduces movement of the payload as the payload is being lowered to the ground. For instance, as noted above, the payload may act as a pendulum while it is being lowered from the UAV, and thus may have a tendency to swing back and forth thru an arc. As such, the UAV 100 may take into account data such as wind data and/or detected movement of the UAV while the payload is being lowered, in order to reactively determine horizontal movements that offset the expected horizontal forces on the payload, and prevent or dampen the oscillation of the payload 108 on the line 102.

D. Detecting at Least One Predetermined Release Indication

As noted above, block 306 of method 300 involves the UAV detecting at least one predetermined release indication, which indicates that the payload is at or near to the ground. Note that the release indication may be specified by the particular VDRP, or may be defined independently from the particular VDRP.

In some embodiments, the function of detecting the at least one release indication may involve determining that the payload is touching the ground. For example, a UAV may determine that the payload is touching the ground and responsively trigger the payload-release mechanism 106 based on sensor data from a pressure sensor and/or proximity sensor on the bottom of the payload 108. Specifically, data from a pressure sensor and/or proximity sensors may indicate that the payload 108 is contacting something, which may be assumed to be the ground.

In some embodiments, a UAV 100 may utilize data from a line-tension sensor to determine when the payload is believed to be touching the ground. In particular, when the UAV 100 detects that the tension on the line has dropped below some threshold measure of tension, the UAV may consider this to be an indication that the payload has reached the ground, and responsively release the payload 108. Specifically, the threshold decrease in tension may be interpreted to mean that the weight of the payload is no longer being supported by the line (as a result of the payload is resting on the ground).

Similarly, data from a proximity sensor may be used to determine payload 108 has reached the ground. For example, the UAV may detect when the sum of the height of the payload itself, the height of the payload-release mechanism (if any), the length of the line 102 that has been let out, and the altitude difference between the top of the line 102 and the point where altitude is measured by the UAV 100 (if any), is equal to or greater than the altitude of the UAV, such that the payload is believed to be on the ground.

In some embodiments, a UAV 100 may utilize data indicating how much line has been let out to determine when the payload is touching the ground. Further, in some embodiments, a UAV could additionally or alternatively use a camera to determine when the payload has reached the ground. For instance, image data from a camera on the UAV and/or on the payload itself could be analyzed to determine when the payload has reached the ground.

In a further aspect, the UAV 100 may use a combination of two or more release indications to determine when the payload has reached the ground. Doing so may help to prevent or reduce the probability of false-positive decreases in line tension, and/or false-positive triggers of a pressure or proximity sensor (e.g., such as might occur if the payload hits a tree branch on the way down), which might cause the payload to be released prematurely.

For example, the UAV may compare the line length and altitude to determine if the payload has been lowered far enough that being on the ground is feasible. More specifically, when the UAV detects a release indication based on a line-tension sensor or a pressure sensor on the payload, the UAV may also require that the length of line be equal to or greater than the altitude of the UAV, before releasing the payload. Other examples are also possible.

In some embodiments, the UAV may release the payload before it reaches the ground, such as when the payload has been lowered to a point where it is deemed safe to drop the payload to the ground. In such an embodiment, the function of detecting the at least one release indication may involve determining that the payload is within a threshold distance from the ground. As described above, the distance between the payload and the ground may be determined based on data from proximity sensors, based on a comparison of the length that has been let out to the altitude of the UAV, and/or based on other data.

IV. Illustrative Types of UAVs

Example methods and system may be implemented in conjunction with or take the form of various types of UAVs. Some examples will now be described; however, it should be understood that example methods and systems are not limited to the UAVs that are described herein. The term "unmanned aerial vehicle," as used in this disclosure, may refer to any autonomous or semi-autonomous vehicle that is capable of performing some functions without a physically-present human pilot. Examples of flight-related functions may include, but are not limited to, sensing its environment or operating in the air without a need for input from an operator, among others.

As noted, a UAV may be autonomous or semi-autonomous. For instance, some functions could be controlled by a remote human operator, while other functions are carried out autonomously. Further, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on. Other examples are also possible.

A UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" ("UAVS"), or "unmanned aerial system" ("UAS") may also be used to refer to a UAV.

Figure 4:
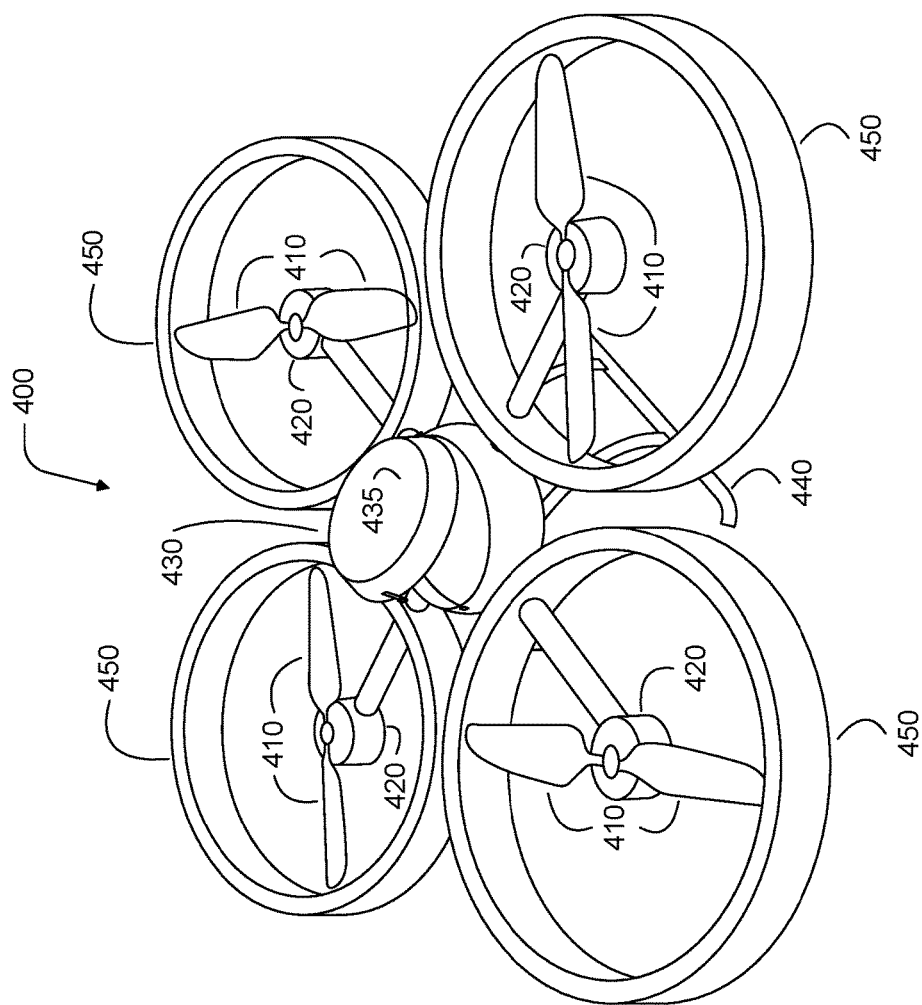
FIGS. 4, 5, 6, and 7 are simplified illustrations of unmanned aerial vehicles, according to example embodiments.

FIG. 4 is a simplified illustration of a UAV, according to an example embodiment. In particular, FIG. 4 shows an example of a rotorcraft 400 that is commonly referred to as a multicopter. Multicopter 400 may also be referred to as a quadcopter, as it includes four rotors 410. It should be understood that example embodiments may involve rotorcraft with more or less rotors than multicopter 400. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 400 in greater detail, the four rotors 410 provide propulsion and maneuverability for the multicopter 400. More specifically, each rotor 410 includes blades that are attached to a motor 420. Configured as such the rotors may allow the multicopter 400 to take off and land vertically, to maneuver in any direction, and/or to hover. Furthermore, the pitch of the blades may be adjusted as a group and/or differentially, and may allow a multicopter 410 to perform three-dimensional aerial maneuvers such as an upside-down hover, a continuous tail-down "tic-toc," loops, loops with pirouettes, stall-turns with pirouette, knife-edge, immelmann, slapper, and traveling flips, among others. When the pitch of all blades is adjusted to perform such aerial maneuvering, this may be referred to as adjusting the "collective pitch" of the multicopter 400. Blade-pitch adjustment may be particularly useful for rotorcraft with substantial inertia in the rotors and/or drive train, but is not limited to such rotorcraft Additionally or alternatively, multicopter 400 may propel and maneuver itself adjust the rotation rate of the motors, collectively or differentially. This technique may be particularly useful for small electric rotorcraft with low inertia in the motors and/or rotor system, but is not limited to such rotorcraft.

Multicopter 400 also includes a central enclosure 430 with a hinged lid 435. The central enclosure may contain, e.g., control electronics such as an inertial measurement unit (IMU) and/or an electronic speed controller, batteries, other sensors, and/or a payload, among other possibilities.

The illustrative multicopter 400 also includes landing gear 440 to assist with controlled take-offs and landings. In other embodiments, multicopters and other types of UAVs without landing gear are also possible.

In a further aspect, multicopter 400 includes rotor protectors 450. Such rotor protectors 450 can serve multiple purposes, such as protecting the rotors 410 from damage if the multicopter 400 strays too close to an object, protecting the multicopter 400 structure from damage, and protecting nearby objects from being damaged by the rotors 410. It should be understood that in other embodiments, multicopters and other types of UAVs without rotor protectors are also possible. Further, rotor protectors of different shapes, sizes, and function are possible, without departing from the scope of the invention.

A multicopter 400 may control the direction and/or speed of its movement by controlling its pitch, roll, yaw, and/or altitude. To do so, multicopter 400 may increase or decrease the speeds at which the rotors 410 spin. For example, by maintaining a constant speed of three rotors 410 and decreasing the speed of a fourth rotor, the multicopter 400 can roll right, roll left, pitch forward, or pitch backward, depending upon which motor has its speed decreased. Specifically, the multicopter may roll in the direction of the motor with the decreased speed. As another example, increasing or decreasing the speed of all rotors 410 simultaneously can result in the multicopter 400 increasing or decreasing its altitude, respectively. As yet another example, increasing or decreasing the speed of rotors 410 that are turning in the same direction can result in the multicopter 400 performing a yaw-left or yaw-right movement. These are but a few examples of the different types of movement that can be accomplished by independently or collectively adjusting the RPM and/or the direction that rotors 410 are spinning.

Figure 5:
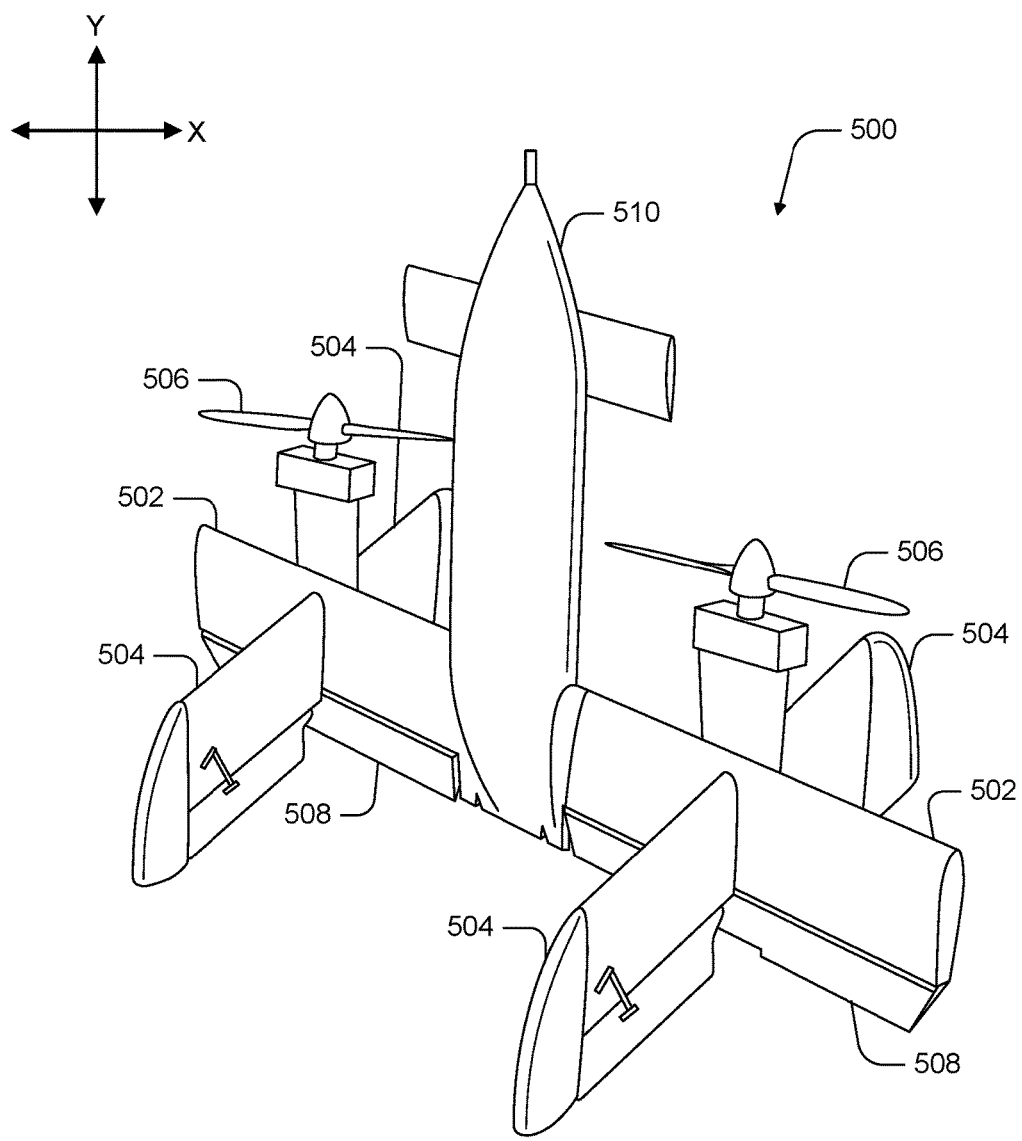

FIG. 5 is a simplified illustration of a UAV, according to an example embodiment. In particular, FIG. 5 shows an example of a tail-sitter UAV 500. In the illustrated example, the tail-sitter UAV 500 has fixed wings 502 to provide lift and allow the UAV to glide horizontally (e.g., along the x-axis, in a position that is approximately perpendicular to the position shown in FIG. 5). However, the fixed wings 502 also allow the tail-sitter UAV 500 take off and land vertically on its own.

For example, at a launch site, tail-sitter UAV 500 may be positioned vertically (as shown) with fins 504 and/or wings 502 resting on the ground and stabilizing the UAV in the vertical position. The tail-sitter UAV 500 may then take off by operating propellers 506 to generate the upward thrust (e.g., a thrust that is generally along the y-axis). Once at a suitable altitude, the tail-sitter UAV 500 may use its flaps 508 to reorient itself in a horizontal position, such that the fuselage 510 is closer to being aligned with the x-axis than the y-axis. Positioned horizontally, the propellers 506 may provide forward thrust so that the tail-sitter UAV 500 can fly in a similar manner as a typical airplane.

Variations on the illustrated tail-sitter UAV 500 are possible. For instance, tail-sitters UAVs with more or less propellers, or that utilize a ducted fan or multiple ducted fans, are also possible. Further, different wing configurations with more wings (e.g., an "x-wing" configuration with four wings), with less wings, or even with no wings, are also possible. More generally, it should be understood that other types of tail-sitter UAVs and variations on the illustrated tail-sitter UAV 500 are also possible.

As noted above, some embodiments may involve other types of UAVs, in addition or in the alternative to multicopters. For instance, FIGS. 6 and 7 are simplified illustrations of other types of UAVs, according to example embodiments.

Figure 6:
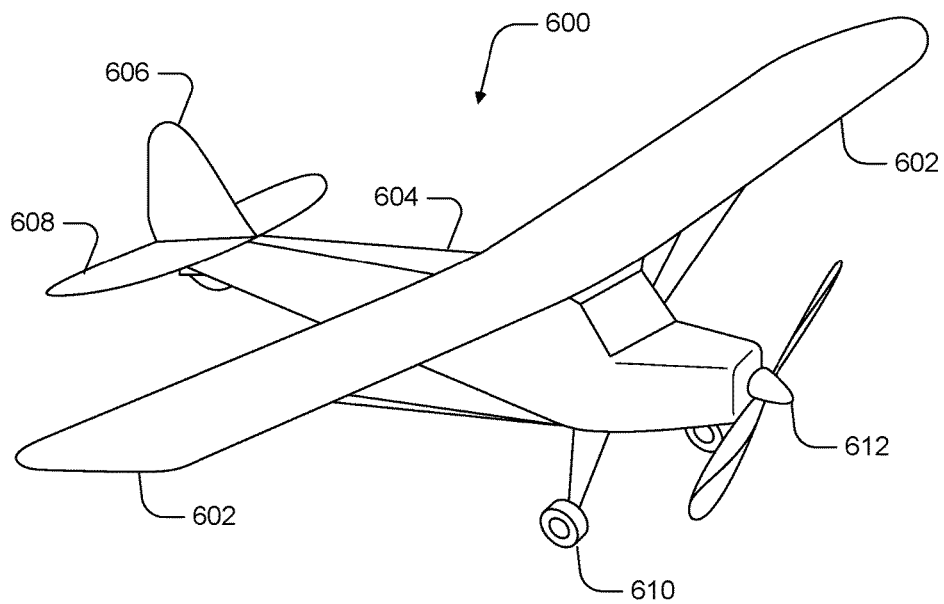

In particular, FIG. 6 shows an example of a fixed-wing aircraft 600, which may also be referred to as an airplane, an aeroplane, or simply a plane. A fixed-wing aircraft 600, as the name implies, has stationary wings 602 that generate lift based on the wing shape and the vehicle's forward airspeed. This wing configuration is different from a rotorcraft's configuration, which produces lift through rotating rotors about a fixed mast, and an ornithopter's configuration, which produces lift by flapping wings.

FIG. 6 depicts some common structures used in a fixed-wing aircraft 600. In particular, fixed-wing aircraft 600 includes a fuselage 604, two horizontal wings 602 with an airfoil-shaped cross section to produce an aerodynamic force, a vertical stabilizer 606 (or fin) to stabilize the plane's yaw (turn left or right), a horizontal stabilizer 608 (also referred to as an elevator or tailplane) to stabilize pitch (tilt up or down), landing gear 610, and a propulsion unit 612, which can include a motor, shaft, and propeller.

Figure 7:
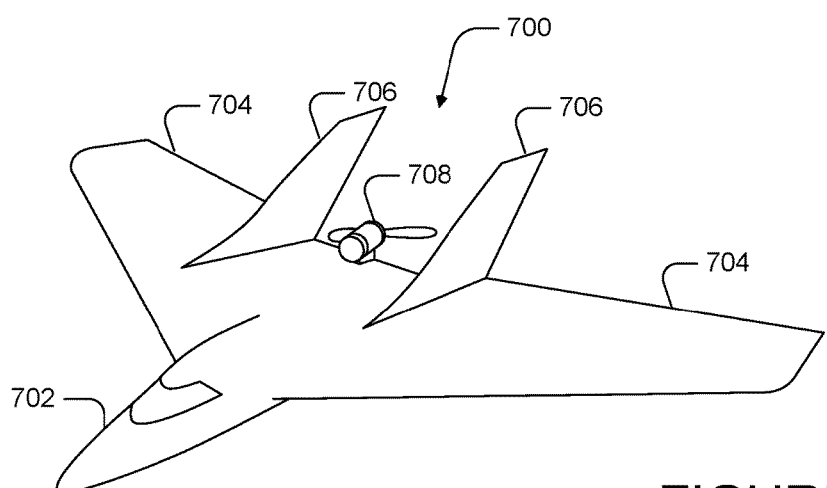

FIG. 7 shows an example of an aircraft 700 with a propeller in a pusher configuration. The term "pusher" refers to the fact that the propulsion unit 708 is mounted at the back of the aircraft and "pushes" the vehicle forward, in contrast to the propulsion unit being mounted at the front of the aircraft. Similar to the description provided for FIG. 6, FIG. 7 depicts common structures used in the pusher plane: a fuselage 702, two horizontal wings 704, vertical stabilizers 706, and a propulsion unit 708, which can include a motor, shaft, and propeller.

UAVs can be launched in various ways, using various types of launch systems (which may also be referred to as deployment systems). A very simple way to launch a UAV is a hand launch. To perform a hand launch, a user holds a portion of the aircraft, preferably away from the spinning rotors, and throws the aircraft into the air while contemporaneously throttling the propulsion unit to generate lift.

Rather than using a hand launch procedure in which the person launching the vehicle is exposed to risk from the quickly spinning propellers, a stationary or mobile launch station can be utilized. For instance, a launch system can include supports, angled and inclined rails, and a backstop. The aircraft begins the launch system stationary on the angled and inclined rails and launches by sufficiently increasing the speed of the propeller to generate forward airspeed along the incline of the launch system. By the end of the angled and inclined rails, the aircraft can have sufficient airspeed to generate lift. As another example, a launch system may include a rail gun or cannon, either of which may launch a UAV by thrusting the UAV into flight. A launch system of this type may launch a UAV quickly and/or may launch a UAV far towards the UAV's destination. Other types of launch systems may also be utilized.

In some cases, there may be no separate launch system for a UAV, as a UAV may be configured to launch itself. For example, a "tail sitter" UAV typically has fixed wings to provide lift and allow the UAV to glide, but also is configured to take off and land vertically on its own. Other examples of self-launching UAVs are also possible.

In a further aspect, various other types of unmanned vehicles may be utilized to provide remote medical support. Such vehicles may include, for example, unmanned ground vehicles (UGVs), unmanned space vehicles (USVs), and/or unmanned underwater vehicles (UUVs). A UGV may be a vehicle which is capable of sensing its own environment and navigating surface-based terrain without input from a driver. Examples of UGVs include watercraft, cars, trucks, buggies, motorcycles, treaded vehicles, and retrieval duck decoys, among others. A UUV is a vehicle that is capable of sensing its own environment and navigating underwater on its own, such as a submersible vehicle. Other types of unmanned vehicles are possible as well.

V. Illustrative Medical Support Systems with UAVs

Figure 8:
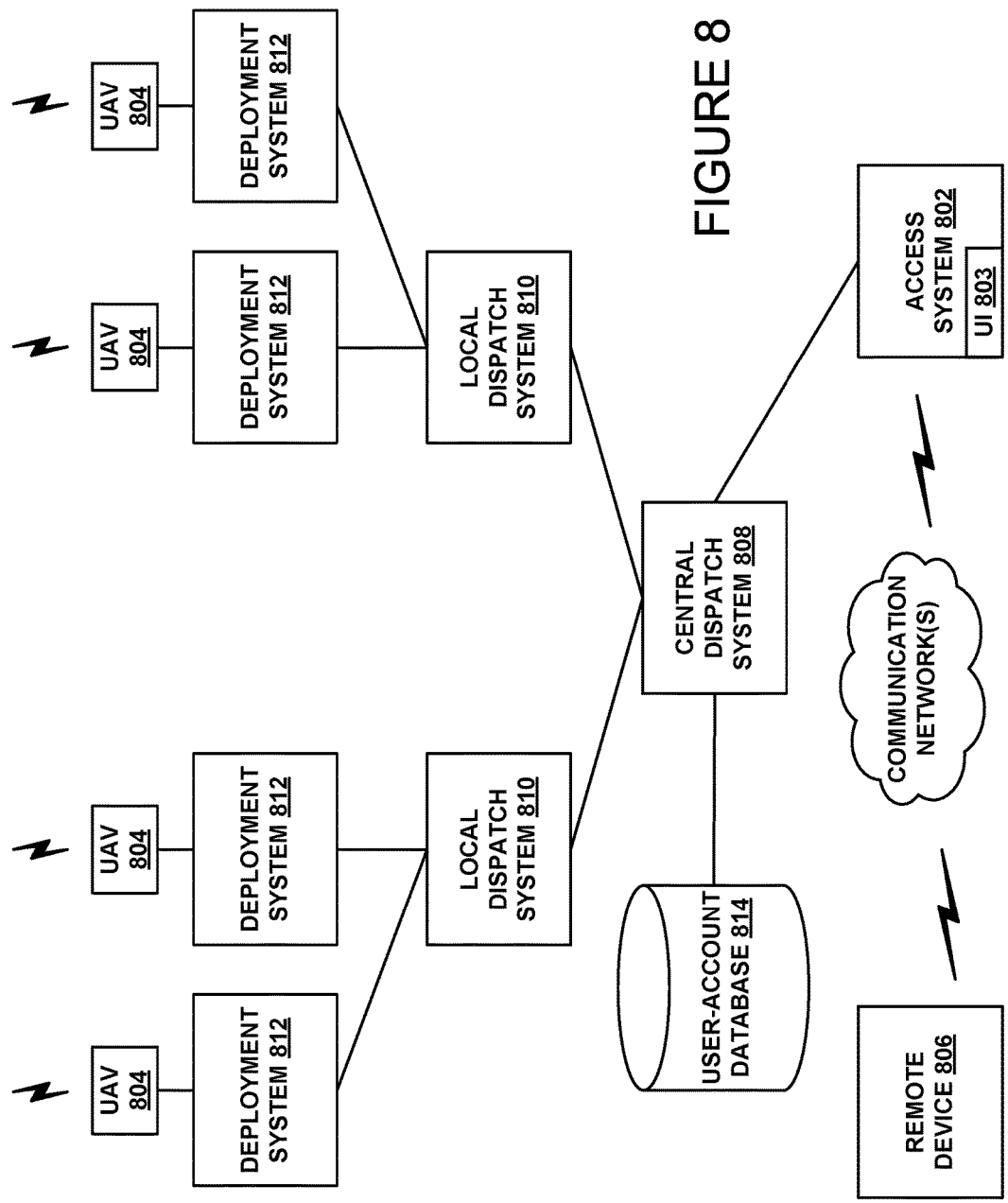
FIG. 8 is a simplified block diagram illustrating a medical support system, according to an example embodiment.

In some embodiments, example methods and systems may implemented in a medical-support system that includes a fleet of UAVs that are distributed throughout a geographic area, such as a city. The medical-support system may be configured for communications with remote devices, such as mobile phones, so that medical support can be requested by a person in need of such medical support (or by others on behalf of a person in need). The medical-support system can then dispatch the appropriate UAV or UAVs to the scene of the medical situation in order to provide medical support. FIG. 8 is a simplified block diagram illustrating a medical support system 800, according to an example embodiment.

In an example embodiments, a medical-support system 800 may include a fleet with a number of different types of UAVs, which are configured for different medical situations. For instance, some UAVs may be configured with items and/or functionality that are expected to be helpful in a cardiac-arrest situation, some UAVs may be configured to help a choking victim, some UAVs may be configured to help a trauma victim, and so on. As such, an illustrative medical-support system 800 may be configured to identify or classify the particular type of medical situation that is occurring, to select the appropriate UAV from those that are available, and to dispatch the selected UAV to the scene of the medical situation.

In a further aspect, a medical-support system may be configured to locate where a medical situation is occurring or has occurred, so that one or more selected UAVs can be dispatched to the location. Further, once the location of the medical situation has been determined, the medical-support system may configure the selected UAV or UAVs to autonomously navigate to (or at least near to) the location of the medical situation. In some embodiments, the medical-support system may configure a UAV to travel to a general location near the scene of medical situation, at which point the medical-support system may provide for remote control of the UAV by an operator, so the operator can manually navigate the UAV to the specific location of the medical situation (e.g., to a specific person in a crowded market).

It should be understood that the above embodiments, and other embodiments described herein, are provided for explanatory purposes, and are not intended to be limiting.

Further, the term "medical situation" as used herein should be understood to include any situation to which government or private entity, such as a police department, a fire department, and/or an emergency medical services (EMS) entity, might dispatch its personnel. Therefore, some medical situations may in fact be non-medical in nature. For example, an emergency situation to which a police car, fire truck, or ambulance might be dispatched may be considered a medical situation for purposes of this disclosure. Medical support may not be required at such emergency situations (e.g., when police are sent to the scene of a non-violent crime). Further, some non-emergency situations to which a police car, fire truck, ambulance, or the like might be dispatched, may also be considered a medical situation for purposes of this disclosure. Thus, while exemplary embodiments may be described as being implemented to help provide medical support at the scene of a medical situation, those skilled in the art will understand that the UAVs, the functionality of such UAVs, and/or other aspects of the embodiments that are explicitly described herein can also apply in non-medical and/or non-emergency applications.

In an illustrative medical-support system 800, an access system 802 may allow for interaction with, control of, and/or utilization of a network of medical-support UAVs 804. In some embodiments, an access system 802 may be a computing system that allows for human-controlled dispatch of UAVs 804. As such, the control system may include or otherwise provide a user interface (UI) 803 via which a user can access and/or control UAVs 804.

As a specific example, access system 802 could be a computing system at a police station or a fire station. Accordingly, a human operator at the police or fire station may receive an indication that a situation exists from a remote device 806 (e.g., a phone call, text message, etc.). The operator may then determine that medical support is appropriate and utilize access system 802 to dispatch one or more UAVs to provide the appropriate medical support. For example, the operator may use the UI 803 of access system 802 to request that a UAV be dispatched to the location of remote device 806 (or to another location indicated by the user of the remote device 806).

A UI 803 of an access system 802 may provide other functionality in addition to allowing for dispatch of UAVs 804. For example, UI 803 may allow an operator to specify certain details related to the medical situation to which the UAV is being dispatched. Examples of such details may include, but are not limited to: (a) general information related to the person or persons involved in the situation, such as age, height, weight, and so on, (b) medical information related to the person or persons involved in the situation, such as medical history, known allergies, and so on, (c) information related to the medical situation itself, such as symptoms exhibited by a person, details of events surrounding the situation (e.g., a car accident), and so on, and (d) desired specifications for the UAV to be dispatched, such as medical-support capabilities, wireless-communication capabilities, and so on.

Further, an access system 802 may provide for remote operation of a UAV. For instance, an access system 802 may allow an operator to control the flight of a UAV via UI 803. As a specific example, an operator may use an access system to dispatch a UAV 804 to the scene of a medical situation. The UAV 804 may then autonomously navigate to the general area where the medical situation is believed to exist (e.g., a stadium). At this point, the operator may use the access system 802 to take over control of the UAV 804, and navigate the UAV to the particular person in need of medical support (e.g., to the person's seat within the stadium). Other examples are also possible.

In an illustrative embodiment, UAVs 804 may take various forms. For example, each UAV 804 may be a UAV such as those illustrated in FIGS. 4 to 7. However, medical support system 800 may also utilize other types of UAVs without departing from the scope of the invention. In some implementations, all UAVs 804 may be of the same or a similar configuration. However, in other implementations, UAVs 804 may include a number of different types of UAVs. For instance, UAVs 804 may include a number of types of UAVs, with each type of UAV being configured for a different type or types of medical support.

A remote device 806 may take various forms. Generally, a remote device 806 may be any device via which a request for medical support can be made and/or via which a situation that may require or benefit from medical support can be reported. For instance, a remote device 806 may be a mobile phone, tablet computer, laptop computer, personal computer, or any network-connected computing device. Further, in some instances, remote device 806 may not be a computing device. As an example, a standard telephone, which allows for communication via plain old telephone service (POTS), may serve as a remote device 806.

Further, a remote device 806 may be configured to communicate with access system 802 via one or more types of communication network(s) 814. For example, a remote device 806 could communicate with access system 802 (or via a human operator of the access system) by placing a phone call over a POTS network, a cellular network, and/or a data network such as the Internet. Other types of networks may also be utilized.

As noted above, a remote device 806 may be configured to allow a user to request medical support. For example, a person may use their mobile phone, a POTS phone, or a VoIP phone, to place an emergency call (e.g., a 9-1-1 call) and request that medical support be provided at the scene of an accident. Further, note that a request for medical support need not be explicit. For instance, a person may place a 9-1-1 call to report an emergency situation. When the 9-1-1 operator receives such a call, the operator may evaluate the information that is provided and decide that medical support is appropriate. Accordingly, the operator may use an access system 802 to dispatch a UAV 804.

In a further aspect, a remote device 806 may be configured to determine and/or provide an indication of its own location. For example, remote device 806 may include a GPS system so that it can include GPS location information (e.g., GPS coordinates) in a communication to an access system 802 and/or to a dispatch system such as central dispatch system 808. As another example, a remote device 806 may use a technique that involves triangulation (e.g., between base stations in a cellular network) to determine its location. Alternatively, another system such as a cellular network may use a technique that involves triangulation to determine the location of a remote device 806, and then send a location message to the remote device 806 to inform the remote device of its location. Other location-determination techniques are also possible.

In an illustrative arrangement, central dispatch system 808 may be a server or group of servers, which is configured to receive dispatch messages requests and/or dispatch instructions from an access system 802. Such dispatch messages may request or instruct the central dispatch system 808 to coordinate the deployment of UAVs for remote medical support. A central dispatch system 808 may be further configured to route such requests or instructions to local dispatch systems 810. To provide such functionality, central dispatch system 808 may communicate with access system 802 via a data network, such as the Internet or a private network that is established for communications between access systems and automated dispatch systems.

In the illustrated configuration, central dispatch system 808 may be configured to coordinate the dispatch of UAVs 804 from a number of different local dispatch systems 810. As such, central dispatch system 808 may keep track of which UAVs 804 are located at which local dispatch systems 810, which UAVs 804 are currently available for deployment, and/or which medical situation or situations each of the UAVs 804 is configured for. Additionally or alternatively, each local dispatch system 810 may be configured to track which of its associated UAVs 804 are currently available for deployment and/or which medical situation or situations each of its associated UAVs is configured for.

In some embodiments, when central dispatch system 808 receives a request for medical support from an access system 802, central dispatch system 808 may select a specific UAV 804 to dispatch. The central dispatch system 808 may accordingly instruct the local dispatch system 810 that is associated with the selected UAV to dispatch the selected UAV. The local dispatch system 810 may then operate its associated deployment system 812 to launch the selected UAV.

As a specific example, central dispatch system 808 may receive a request for medical support that indicates a certain type of medical situation and a location where the situation is occurring. Take, for instance, a request for medical support at the home of a person who appears to have suffered from cardiac arrest. In this scenario, the central dispatch system 808 may evaluate the fleet of UAVs 804 to select the closest available UAV to the person's home that is configured to provide medical support when a heart attack has occurred. Alternatively, the central dispatch system 808 may select an available UAV that is within a certain distance from the person's home (which may or may not be the closest), and which is configured to provide medical support when cardiac arrest has occurred.

In other embodiments, a central dispatch system 808 may forward a request for medical support to a local dispatch system 810 that is near the location where the support is requested, and leave the selection of a particular UAV 804 to the local dispatch system 810. For instance, in a variation on the above example, central dispatch system 808 may forward a request for medical support at the home of a person who appears to have suffered from a heart attack to the local dispatch system 810 that is closest to, or within a certain distance from, the person's home. Upon receipt of the request, the local dispatch system 810 may then determine which of its associated UAVs is configured to provide medical support to a heart-attack victim, and deploy this UAV.

In an example configuration, a local dispatch system 810 may be implemented in a computing system at the same location as the deployment system or systems 812 that it controls. For example, in some embodiments, a local dispatch system 810 could be implemented by a computing system at a building, such as a fire station, where the deployment systems 812 and UAVs 804 that are associated with the particular local dispatch system 810 are also located. In other embodiments, a local dispatch system 810 could be implemented at a location that is remote to its associated deployment systems 812 and UAVs 804.

Numerous variations on and alternatives to the illustrated configuration of medical support system 800 are possible. For example, in some embodiments, a user of a remote device 806 could request medical support directly from a central dispatch system 808. To do so, an application may be implemented on a remote device 806 that allows the user to provide information regarding a medical situation, and generate and send a data message to request medical support. Such an application might also allow the user to request a particular type of medical support (e.g., by requesting that a UAV deliver a certain kind of medicine). In such an embodiment, central dispatch system 808 may include automated functionality to handle requests that are generated by such an application, evaluate such requests, and, if appropriate, coordinate with an appropriate local dispatch system 810 to deploy a UAV.

Further, in some implementations, some or all of the functionality that is attributed herein to central dispatch system 808, local dispatch system(s) 810, access system 802, and/or deployment system(s) 812 could be combined in a single system, implemented in a more complex system, and/or redistributed among central dispatch system 808, local dispatch system(s) 810, access system 802, and/or deployment system(s) 812 in various ways.

Yet further, while each local dispatch system 810 is shown as having two associated deployment systems, a given local dispatch system 810 may have more or less associated deployment systems. Similarly, while central dispatch system 808 is shown as being in communication with two local dispatch systems 810, a central dispatch system may be in communication with more or less local dispatch systems 810.

In a further aspect, a deployment system 812 may take various forms. In general, a deployment system may take the form of or include a system for physically launching a UAV 804. Further, a deployment system 812 may be configured to launch one particular UAV 804, or to launch multiple UAVs 804. A deployment system 812 may further be configured to provide additional functions, including for example, diagnostic-related functions such as verifying system functionality of the UAV, verifying functionality of devices that are housed within a UAV (e.g., such as a defibrillator, a mobile phone, or an HMD), and/or maintaining devices or other items that are housed in the UAV (e.g., by charging a defibrillator, mobile phone, or HMD, or by checking that medicine has not expired).

In some embodiments, the deployment systems 812 and their corresponding UAVs 804 (and possibly associated local dispatch systems 810) may be strategically distributed throughout an area such as a city. For example, deployment systems 812 may be located on the roofs of certain municipal buildings, such as fire stations, which can thus serve as the dispatch locations for UAVs 804. Fire stations may function well for UAV dispatch, as fire stations tend to be distributed well with respect to population density, their roofs tend to be flat, and the use of firehouse roofs as leased spaces for UAV dispatch could further the public good. However, deployment systems 812 (and possibly the local dispatch systems 810) may be distributed in other ways, depending upon the particular implementation.

In a further aspect, a medical-support system 800 may include or have access to a user-account database 814. The user-account database 814 may include data for a number of user-accounts, which are each associated with one or more person. For a given user-account, the user-account database 814 may include data related to the associated person or persons' medical history and/or may include other data related to the associated person or persons. Note that the medical-support system may only acquire, store, and utilize data related to a person with that person's explicit permission to do so.

Further, in some embodiments, a person may have to register for a user-account with the medical-support system 800 in order to use or be provided with medical support by the UAVs 804 of medical-support system 800. As such, the user-account database 814 may include authorization information for a given user-account (e.g., a user-name and password), and/or other information that may be used to authorize access to a user-account.

In some embodiments, a person may associate one or more of their devices with their user-account, such that they can be provided with access to the services of medical-support system 800. For example, when a person uses an associated mobile phone to, e.g., place a call to an operator of access system 802 or send a message requesting medical support to a dispatch system, the phone may be identified via a unique device identification number, and the call or message may then be attributed to the associated user-account. In addition or in the alternative to being an authorization mechanism, identifying the user-account may allow information such as the person's medical history to be used in responding to their request for medical support.

In a further aspect, the user-account database 814 may include data indicating a service level for each user. More specifically, a medical-support system 800 may provide service according to a number of different service levels, which correspond to different types of medical support. For example, a higher service level may: (a) provide access to additional types of UAVs, (b) provide medical support for additional medical situations, (c) provide access to improved support for a given medical situation, and/or (d) have priority as far as response time to requests for medical support, as compared to a lower service level. Other differences between a higher and lower service level are also possible.

In some embodiments, there may be no individual user accounts associated with a medical system; or, user accounts may exist but may not be used for purposes of determining whether a person should be provided medical support and/or for purposes of determining the quality of medical support that should be provided. For example, a medical support system may be implemented by a municipality or another public entity to provide medical support to citizens for free or at an equal cost. Other examples are also possible.

VI. Illustrative Components of a Medical-Support UAV

Figure 9:
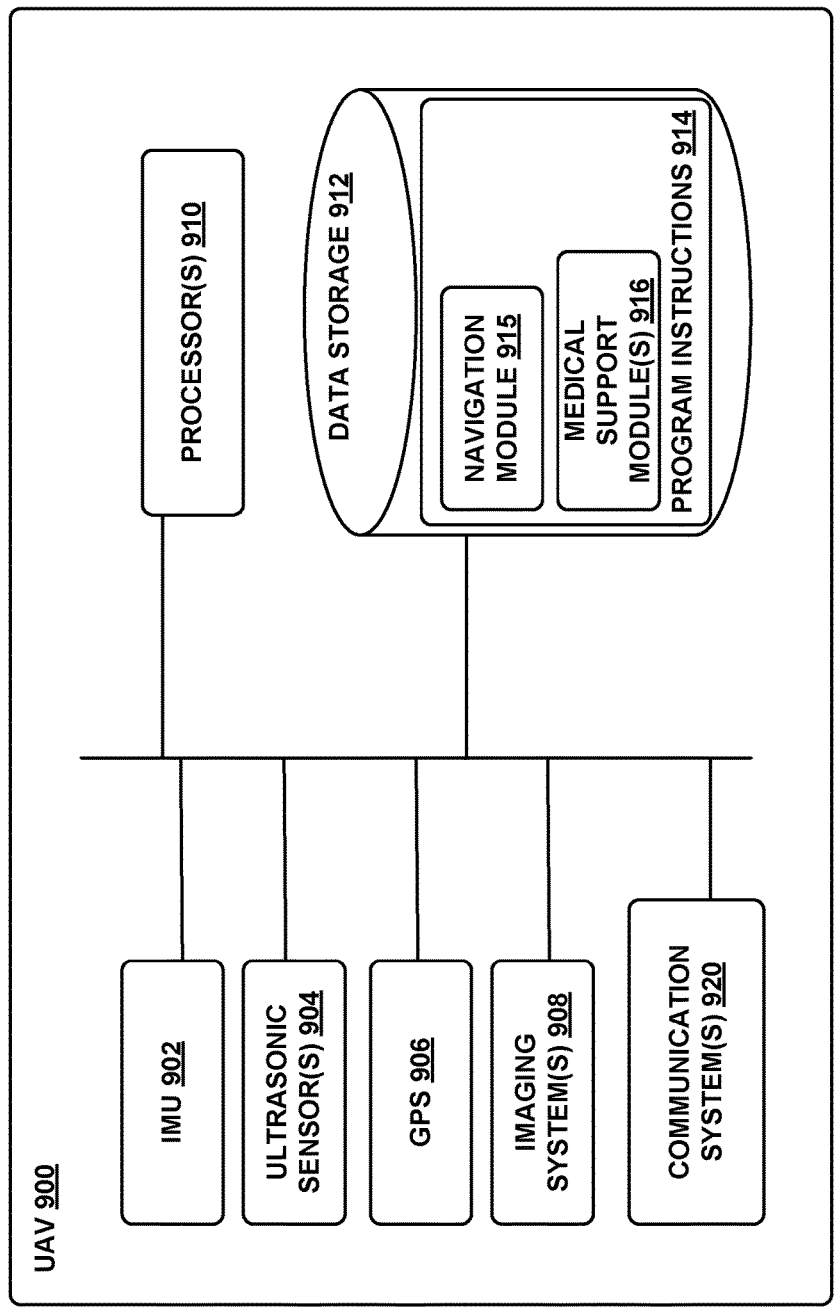
FIG. 9 is a simplified block diagram illustrating components of an unmanned aerial vehicle, according to an example embodiment.

FIG. 9 is a simplified block diagram illustrating components of a UAV 900, according to an example embodiment. UAV 900 may take the form of or be similar in form to one of the UAVs 400, 500, 600, and 700 shown in FIGS. 4, 5, 6, and 7. However, a UAV 900 may also take other forms. Further, UAV 900 may include components and features that are not explicitly shown, such as components and features of the UAVs 100 and 200 shown in FIGS. 1A-B and 2A-C.

UAV 900 may include various types of sensors, and may include a computing system configured to provide the functionality described herein. In the illustrated embodiment, the sensors of UAV 900 include an inertial measurement unit (IMU) 902, ultrasonic sensor(s) 904, GPS 906, imaging system(s) 908, among other possible sensors and sensing systems.

In the illustrated embodiment, UAV 900 also includes one or more processors 910. A processor 910 may be a general-purpose processor or a special purpose processor (e.g., digital signal processors, application specific integrated circuits, etc.). The one or more processors 910 can be configured to execute computer-readable program instructions 914 that are stored in the data storage 912 and are executable to provide the functionality of a UAV described herein.

The data storage 912 may include or take the form of one or more computer-readable storage media that can be read or accessed by at least one processor 910. The one or more computer-readable storage media can include volatile and/or non-volatile storage components, such as optical, magnetic, organic or other memory or disc storage, which can be integrated in whole or in part with at least one of the one or more processors 910. In some embodiments, the data storage 912 can be implemented using a single physical device (e.g., one optical, magnetic, organic or other memory or disc storage unit), while in other embodiments, the data storage 912 can be implemented using two or more physical devices.

As noted, the data storage 912 can include computer-readable program instructions 914 and perhaps additional data, such as diagnostic data of the UAV 900. As such, the data storage 914 may include program instructions to perform or facilitate some or all of the UAV functionality described herein. For instance, in the illustrated embodiment, program instructions 914 include a navigation module 915 and one or more medical-support modules 916.

A. Sensors

In an illustrative embodiment, IMU 902 may include both an accelerometer and a gyroscope, which may be used together to determine the orientation of the UAV 900. In particular, the accelerometer can measure the orientation of the vehicle with respect to earth, while the gyroscope measures the rate of rotation around an axis. IMUs are commercially available in low-cost, low-power packages. For instance, an IMU 902 may take the form of or include a miniaturized MicroElectroMechanical System (MEMS) or a NanoElectroMechanical System (NEMS). Other types of IMUs may also be utilized.

An IMU 902 may include other sensors, in addition to accelerometers and gyroscopes, which may help to better determine position and/or help to increase autonomy of the UAV 900. Two examples of such sensors are magnetometers and pressure sensors. Other examples are also possible. (Note that a UAV could also include such additional sensors as separate components from an IMU.)

While an accelerometer and gyroscope may be effective at determining the orientation of the UAV 900, slight errors in measurement may compound over time and result in a more significant error. However, an example UAV 900 may be able mitigate or reduce such errors by using a magnetometer to measure direction. One example of a magnetometer is a low-power, digital 3-axis magnetometer, which can be used to realize an orientation independent electronic compass for accurate heading information. However, other types of magnetometers may be utilized as well.

UAV 900 may also include a pressure sensor or barometer, which can be used to determine the altitude of the UAV 900. Alternatively, other sensors, such as sonic altimeters or radar altimeters, can be used to provide an indication of altitude, which may help to improve the accuracy of and/or prevent drift of an IMU.

In a further aspect, UAV 900 may include one or more sensors that allow the UAV to sense objects in the environment. For instance, in the illustrated embodiment, UAV 900 includes ultrasonic sensor(s) 904. Ultrasonic sensor(s) 904 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

UAV 900 also includes a GPS receiver 906. The GPS receiver 906 may be configured to provide data that is typical of well-known GPS systems, such as the GPS coordinates of the UAV 900. Such GPS data may be utilized by the UAV 900 for various functions. For example, when a caller uses a mobile device to request medical support from a UAV, the mobile device may provide its GPS coordinates. As such, the UAV may use its GPS receiver 906 to help navigate to the caller's location, as indicated, at least in part, by the GPS coordinates provided by their mobile device. Other examples are also possible.

UAV 900 may also include one or more imaging system(s) 908. For example, one or more still and/or video cameras may be utilized by a UAV 900 to capture image data from the UAV's environment. As a specific example, charge-coupled device (CCD) cameras or complementary metal-oxide-semiconductor (CMOS) cameras can be used with unmanned vehicles. Such imaging sensor(s) 908 have numerous possible applications, such as obstacle avoidance, localization techniques, ground tracking for more accurate navigation (e.g., by applying optical flow techniques to images), video feedback, and/or image recognition and processing, among other possibilities.

In a further aspect, UAV 900 may use its one or more imaging system 908 to help in determining location. For example, UAV 900 may capture imagery of its environment and compare it to what it expects to see in its environment given current estimated position (e.g., its current GPS coordinates), and refine its estimate of its position based on this comparison.

In a further aspect, UAV 900 may include one or more microphones. Such microphones may be configured to capture sound from the UAVs environment.

B. Navigation and Location Determination

The navigation module 915 may provide functionality that allows the UAV 900 to, e.g., move about in its environment and reach a desired location. To do so, the navigation module 915 may control the altitude and/or direction of flight by controlling the mechanical features of the UAV that affect flight (e.g., rotors 410 of UAV 400).

In order to navigate the UAV 900 to a target location, a navigation module 915 may implement various navigation techniques, such as map-based navigation and localization-based navigation, for instance. With map-based navigation, the UAV 900 may be provided with a map of its environment, which may then be used to navigate to a particular location on the map. With localization-based navigation, the UAV 900 may be capable of navigating in an unknown environment using localization. Localization-based navigation may involve a UAV 900 building its own map of its environment and calculating its position within the map and/or the position of objects in the environment. For example, as a UAV 900 moves throughout its environment, the UAV 900 may continuously use localization to update its map of the environment. This continuous mapping process may be referred to as simultaneous localization and mapping (SLAM). Other navigation techniques may also be utilized.

In some embodiments, the navigation module 915 may navigate using a technique that relies on waypoints. In particular, waypoints are sets of coordinates that identify points in physical space. For instance, an air-navigation waypoint may be defined by a certain latitude, longitude, and altitude. Accordingly, navigation module 915 may cause UAV 900 to move from waypoint to waypoint, in order to ultimately travel to a final destination (e.g., a final waypoint in a sequence of waypoints).

In a further aspect, navigation module 915 and/or other components and systems of UAV 900 may be configured for "localization" to more precisely navigate to the scene of a medical situation. More specifically, it may be desirable in certain situations for a UAV to be close to the person in need of medical support (e.g., within reach of the person), so as to properly provide medical support to the person. To this end, a UAV may use a two-tiered approach in which it uses a more-general location-determination technique to navigate to a target location or area that is associated with the medical situation, and then use a more-refined location-determination technique to identify and/or navigate to the target location within the general area.

For example, a UAV 900 may navigate to the general area of a person in need using waypoints that are pre-determined based on GPS coordinates provided by a remote device at the scene of the medical situation. The UAV may then switch to mode in which it utilizes a localization process to locate and travel to a specific location of the person in need. For example, if a person is having a heart attack at a large stadium, a UAV 900 carrying a medical package may need to be within reach of the person or someone near the person so that the can take items from the package. However, a GPS signal may only get a UAV so far, e.g., to the stadium. A more precise location-determination technique may then be used to find the specific location of the person within the stadium.

Various types of location-determination techniques may be used to accomplish localization of a person once a UAV 900 has navigated to the general area of the person. For instance, a UAV 900 may be equipped with one or more sensory systems, such as, for example, imaging system(s) 908, a directional microphone array (not shown), ultrasonic sensors 904, infrared sensors (not shown), and/or other sensors, which may provide input that the navigation module 915 utilizes to navigate autonomously or semi-autonomously to the specific location of a person.

As another example, once the UAV 900 reaches the general area of the person, the UAV 900 may switch to a "fly-by-wire" mode where it is controlled, at least in part, by a remote operator, who can navigate the UAV 900 to the specific location of the person in need. To this end, sensory data from the UAV 900 may be sent to the remote operator to assist them in navigating the UAV to the specific location. For example, the UAV 900 may stream a video feed or a sequence of still images from the UAV's imaging system(s) 908. Other examples are possible.

As yet another example, the UAV 900 may include a module that is able to signal to a passer-by for assistance in either reaching the specific location or delivering its medical-support items to the medical situation; for example, by displaying a visual message in a graphic display, playing an audio message or tone through speakers, flashing a light, or performing a combination of such functions. Such visual or audio message might indicate that assistance is needed in delivering the UAV 900 to the person in need, and might provide information to assist the passer-by in delivering the UAV 900 to the person, such a description of the person, the person's name, and/or a description of the person's specific location, among other possibilities. This implementation can be useful in a scenario in which the UAV is unable to use sensory functions or another location-determination technique to determine the specific location of the person.

As an additional example, once a UAV 900 arrives at the general area of a person, the UAV may utilize a beacon from the remote device (e.g., the mobile phone of a person who called for medical support) to locate the person. Such a beacon may take various forms. As an example, consider the scenario where a remote device, such as the mobile phone of a person in need or a bystander, is able to send out directional signals (e.g., an RF signal, a light signal and/or an audio signal). In this scenario, the UAV may be configured to navigate by "sourcing" such directional signals—in other words, by determining where the signal is strongest and navigating accordingly. As another example, a mobile device can emit a frequency, either in the human range or outside the human range, and the UAV can listen for that frequency and navigate accordingly. As a related example, if the UAV is listening for spoken commands, then the UAV could utilize spoken statements, such as "Help! I'm over here!" to source the specific location of the person in need of medical assistance.

In an alternative arrangement, a navigation module may be implemented at a remote computing device, which communicates wirelessly with the UAV. The remote computing device may receive data indicating the operational state of the UAV, sensor data from the UAV that allows it to assess the environmental conditions being experienced by the UAV, and/or location information for the UAV. Provided with such information, the remote computing device may determine altitudinal and/or directional adjustments that should be made by the UAV and/or may determine how the UAV should adjust its mechanical features (e.g., rotors 410 of UAV 400) in order to effectuate such movements. The remote computing system may then communicate such adjustments to the UAV so it can move in the determined manner.

C. Communication Systems

In a further aspect, UAV 900 includes one or more communication systems 920. The communications systems 920 may include one or more wireless interfaces and/or one or more wireline interfaces, which allow UAV 900 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, a UAV 900 may include communication systems 920 that allow for both short-range communication and long-range communication. For example, the UAV 900 may be configured for short-range communications using Bluetooth and for long-range communications under a CDMA protocol. In such an embodiment, the UAV 900 may be configured to function as a "hot spot;" or in other words, as a gateway or proxy between a remote support device and one or more data networks, such as cellular network and/or the Internet. Configured as such, the UAV 900 may facilitate data communications that the remote support device would otherwise be unable to perform by itself.

For example, UAV 900 may provide a WiFi connection to a remote device, and serve as a proxy or gateway to a cellular service provider's data network, which the UAV might connect to under an LTE or a 3G protocol, for instance. The UAV 900 could also serve as a proxy or gateway to a high-altitude balloon network, a satellite network, or a combination of these networks, among others, which a remote device might not be able to otherwise access.

D. Power Systems

In a further aspect, UAV 900 may include power system(s) 921. A power system 921 may include one or more batteries for providing power to the UAV 900. In one example, the one or more batteries may be rechargeable and each battery may be recharged via a wired connection between the battery and a power supply and/or via a wireless charging system, such as an inductive charging system that applies an external time-varying magnetic field to an internal battery.

E. Medical-Support Functionality

As noted above, UAV 900 may include one or more medical-support modules 916. The one or more medical-support modules 916 include software, firmware, and/or hardware that may help to provide or assist in the provision of the medical-support functionality described herein.

Configured as such, a UAV 900 may provide medical support in various ways. For instance, a UAV 900 may have stored information that can be provided to a person or persons at the target location, in order to assist the person or persons in providing medical care. For example, a UAV may include a video or audio file with instructions for providing medical support, which the UAV can play out to a person at the target location. As another example, a UAV may include an interactive program to assist a person at the target location in providing medical support. For instance, a UAV may include an application that analyzes the person's speech to detect questions related to the medical situation and/or that provides a text-based interface via which the person can ask such questions, and then determines and provides answers to such questions.

In some embodiments, a UAV 900 may facilitate communication between a layperson and/or medical personnel at the scene and medical personnel at a remote location. As an example, a medical support module 916 may provide a user interface via which a person at the scene can use a communication system 920 of the UAV to communicate with an emergency medical technician at a remote location. As another example, the UAV 900 can unlock certain capabilities of a remote device, such as a mobile phone, which is near the UAV at the scene of a medical situation. Such capabilities may be inaccessible to a user of the remote device, unless the remote device is within a certain distance from the UAV such that the UAV can unlock the capabilities. For example, a UAV may send the remote device a security key that allows the remote device to establish a secure connection to communicate with medical personnel at a remote location. Other examples are also possible.

Further, in order to provide medical support at a remote location, a UAV 900 may be configured to transport items to the scene of a medical situation. Such items may aid in diagnosing and/or treating a person who needs medical assistance, or may serve other purposes. Such items may include, as examples: (a) medicines, (b) diagnostic devices, such as a pulse oximeter, blood pressure sensor, or EKG sensor, (c) treatment devices, such as an EpiPen, a first aid kit, or various kinds of defibrillators (e.g., an automated external defibrillator (AED)), and/or (d) remote support devices, such as a mobile phone or a head-mountable device (HMD), among other possibilities. Note that some items that are electronic may include one or more batteries to provide power to the item. These batteries may be rechargeable and may be recharged using one or more wired or wireless charging systems. In addition or on in the alternative, an item may be integrated with one or more batteries in the power system 921 for power.

A UAV 900 may employ various systems and configurations in order to transport items to the scene of a medical situation. For example, as shown in FIG. 4, a UAV 400 can include a compartment 435, in which an item or items may be transported. As another example, the UAV can include a pick-and-place mechanism, which can pick up and hold the item while the UAV is in flight, and then release the item during or after the UAV's descent. As yet another example, a UAV could include an air-bag drop system, a parachute drop system, and/or a winch system that is operable from high above a medical situation to drop or lower an item or items to the scene of the medical situation. Other examples are also possible.

In some implementations, a given UAV 900 may include a "package" designed for a particular medical situation (or possibly for a particular set of medical situations). A package may include one or more items for medical support in the particular medical situation, and/or one or more medical-support modules 916 that are designed to provide medical support in the particular medical situation. In some cases, a UAV 900 may include a package that is designed for a particular medical situation such as choking, cardiac arrest, shock, asthma, drowning, etc.

In other cases, a UAV 900 may include a package that is designed for a number of different medical situations, which may be associated in some way. For example, a dive-accident package may be designed to provide or assist in provision of care in various medical situations that are often associated with a scuba diving accident, such as drowning and/or decompression sickness. Such a dive-accident package might include a flotation device, an oxygen-therapy system, a system for delivering visual and/or audible medical care instructions (e.g., instructions for performing CPR), and/or a signaling device, among other possibilities. A UAV 900 that is configured with such a dive-accident package may be referred to herein as a "dive-rescue" UAV. Such a dive-rescue UAV may be deployed to a diver on the surface of the water, who has just had an accident while scuba diving, with the hope that the UAV can reach the diver and deliver medical treatment sooner than would otherwise be possible.

For instance, provided with the above dive-accident package, the UAV 900 may drop a flotation device to help the diver stay afloat until the diver can be reached by rescuers. In addition, the UAV may include a signaling device, which can be automatically turned on when the UAV locates the diver. Doing so may help a rescue boat locate a diver more quickly. Further, once the diver has been rescued, the UAV may display visual instructions and/or play back auditory instructions for CPR, which may help to revive a drowning victim. Such instructions may be particularly useful in the case where the diver is rescued by non-medical professionals; if the diver is rescued by a passing fishing boat, for example.

Further, when the UAV arrives at the scene of a dive accident or, more likely, once the diver has been moved to a rescue boat, the UAV could provide an oxygen-therapy system, and possibly instructions for use thereof, in order to treat possible decompression sickness. Since a rescue boat might not have oxygen-therapy system, and immediate administration of pure oxygen has been shown to increase the probability of recovering from decompression sickness, such functionality of a UAV could improve treatment for a diver suffering from decompression sickness.

In some embodiments, a UAV 900 could include an integrated system or device for administering or assisting in the administration of medical care (e.g., a system or device having one or more components that are built in to the structure of the UAV itself). For example, as noted above, a UAV could include an oxygen-therapy system. In an example configuration, an oxygen-therapy system might include a mask that is connected via tubing to an on-board oxygen source. Configured as such, the UAV could release the oxygen mask when it reaches a person in need of oxygen (e.g., at a fire scene).

As another example of a UAV with an integrated medical-support device, a UAV 900 might function as a mobile defibrillator. Specifically, rather than carry a stand-alone defibrillator that can then be removed from the UAV for use, the UAV itself may function as a defibrillator.

As a specific example, a multicopter might include components of an AED that is built into its body, as well as retractable electrode pads for administering a shock to a person who is experiencing a cardiac event or arrest. When the multicopter arrives at the scene of cardiac arrest, the multicopter may land, disable its rotors, and enter a mode where it functions as an AED. Specifically, after landing, the multicopter may release its retractable electrode pads and provide instructions so that a bystander, who might be layperson, could use the electrode pads to administer care to the person with a cardiac arrest. Such instructions may be provided, for example, by displaying text and/or video on a graphic display that is built in to the body of the multicopter, and/or by playing back audio instructions. The multicopter could also include a wireless communication interface via which a bystander could communicate with a live remote operator (e.g., a medical professional at a remote location), in order to receive instructions for using the AED Many other examples and variations on the above examples of UAVs with integrated medical-support systems and devices are also possible. For instance, a medical device may be integrated into the structure of a UAV itself when doing so reduces weight, improves aerodynamics, and/or simplifies the use of the device by a person at the scene of the medical situation. Further, those skilled in the art will appreciate that a medical-support system or device may be integrated in the structure of a UAV in other situations and for other reasons.

In some applications, a UAV 900 may be dispatched to the scene of a medical situation to provide early intelligence to medical personnel. In particular, a UAV 900 may be dispatched because it is expected to reach the location of a medical situation more rapidly than medical personnel are able to. In this scenario, the UAV 900 may arrive at the scene and provide early intelligence by communicating information and providing situational awareness to medical personnel. For example, a UAV 900 may use its imaging system(s) 908 to capture video and/or still images at the scene of the medical situation, which the UAV 900 may communicate to medical and/or emergency personnel. As another example, UAV 900 could administer preliminary tests to a person in need, or request that a bystander administer certain preliminary diagnostic tests and/or provide certain information. UAV 900 may then send such test results and/or such information provided by a bystander to medical and/or emergency personnel. A UAV 900 may provide other types of early-intelligence information as well.

By providing early intelligence to medical and/or emergency personnel, a UAV 900 may help the medical and/or emergency personnel to prepare to provide care, such that more effective care can be provided once the personnel arrive at the scene. For instance, a UAV 900 could send video, test results, and/or bystander-provided information to medical personnel while they are travelling in an ambulance on their way to the scene, to firemen or other personnel while they are in a fire truck on their way to the scene, and/or to police they are in a law-enforcement vehicle on their way to the scene, among other possibilities.

It should be understood that the examples of medical-support functionality that are provided herein are not intended to be limited. A UAV may be configured to provide other types of medical-support functionality without departing from the scope of the invention.

Figure 10:
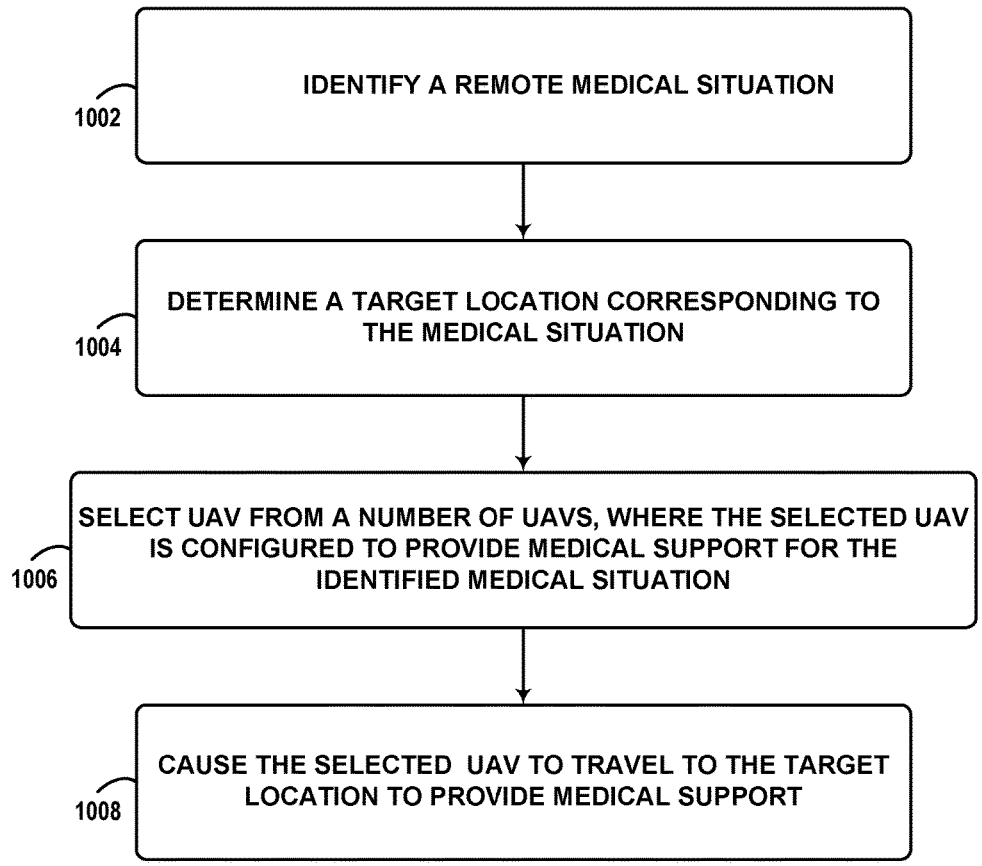
FIG. 10 is a flow chart illustrating a method, according to an example embodiment.

In a further aspect, an example UAV may be configured to fly from a launch site to a delivery location. FIG. 10 is a flow chart illustrating a method 1000 for deploying a UAV to travel to a target location, according to an example embodiment. Method 1000 may be implemented in conjunction with an example method, such as method 300, to fly to a target location and lower a payload to the ground while hovering over the target location.

Method 1000 may be carried out in whole or in part by a component or components in a medical-support system, such as by the one or more of the components of the medical-support system 800 shown in FIG. 8. For simplicity, method 1000 may be described generally as being carried out by a medical-support system, such as by one or more of an access system 802, a central dispatch system 808, a local dispatch system 810, and/or a deployment system 812. However, it should be understood that example methods, such as method 1000, may be carried out by other entities or combinations of entities (i.e., by other computing devices and/or combinations of computing devices), without departing from the scope of the invention.

As shown by block 1002, method 1000 involves a medical-support system identifying a remote medical situation. The medical-support system may also determine the target location corresponding to the medical situation, as shown by block 1004. The medical-support system can then select a UAV from a plurality of UAVs, where the selection of the UAV is based at least in part on a determination that the selected UAV is configured for the identified medical situation, as shown by 1006. More specifically, in an illustrative embodiment, the medical-support system may have a number of UAVs available for dispatch, which are configured for a number of different medical situations (with some or all of the UAVs being configured differently from one another). Accordingly, at block 1006, the medical-support system may select the particular UAV that is appropriate for the identified medical situation. The medical-support system may then cause the selected UAV to travel to the target location to provide medical support, as shown by block 1008.

F. Identifying a Remote Medical Situation

Various types of medical situations may be identified at block 1002 of method 1000. For example, a medical-support system could identify a medical situation such as the occurrence of a heart attack, a stroke, an anaphylactic shock, a broken bone, heat stroke, or any of a large number of other medical situations. More generally, a medical situation may be any situation where a person or possibly even an animal (e.g., a pet dog or cat) might benefit from medical support or treatment.

In some embodiments, however, a medical-support system may place more stringent requirements on what is classified as a medical situation to which a UAV should be dispatched. In particular, since deploying and operating an UAV may be costly, a medical-support system may only dispatch a UAV in a situation where the UAV is expected to provide more immediate and/or superior medical support, as compared to traditional emergency response services. In some embodiments, the medical-support system may even engage in cost-benefit analysis to determine whether the expected benefit of sending a UAV outweighs the expense of doing so. Other criteria for determining what is and is not considered a medical situation that justifies use of a UAV are also possible, and may vary depending upon the particular implementation.

In other embodiments, the benefit of having a UAV there slightly earlier may be great enough that the UAV may be deployed as soon as a possible medical situation is reported; without waiting to determine whether the use of a UAV is justified. Then, at a later time (e.g., 30-60 seconds after launch), the medical-support system may have a better understanding as to whether or not the possible medical situation is in fact a medical situation to which a UAV should be deployed. If it is not, then the UAV may recalled; or the UAV may automatically return if it does not receive a message indicating that it should continue to the location of the medical situation.

At block 1002, the identification of the remote medical situation may involve a component of the medical-support system receiving a communication that originated from a remote device, and identifying the remote medical situation based on information provided by the communication. Such a communication may take various forms, such as a phone call, a text-message, or an electronic message generated by an application of a remote device, as just a few examples. In some embodiments, an automated computer program on a remote device may act as a notifier and initiate a communication to report a medical situation. For example, a body-monitoring device may detect a possible medical situation, such as a stroke or heart attack, and automatically notify a medical support system. Other examples are also possible.

In some embodiments, the communication may include location information, such as GPS coordinates of the remote device. Such location information may be utilized at block 1004 to determine the location of the remote device, which may in turn be assumed to be or otherwise used to determine the location of medical situation.

Further, in order to identify what the particular medical situation is, the medical-support system may utilize information provided via the communication from the remote device. Specifically, such information may be used in an effort to better identify the type of medical situations that is at issue, or to identify a class of medical situations for which the person's medical situation likely qualifies. In some embodiments, this information may be provided by the person operating the remote device, who may be referred to herein as the "notifier." For instance, a notifier might provide information such as the observed symptoms of the person in need (e.g., "my friend just collapsed and is convulsing" or "I am having chest pains"). In some instances, the notifier might purport to convey the type of medical emergency itself ("my brother is having a stroke!"). Further, a notifier might provide location information and/or other types of information related to a medical situation.

The information provided via the communication from the remote device may take various forms. For example, the notifier may provide information via a voice call, in which case they can simply speak with a live operator (e.g., a live operator at access system 802). Alternatively, a speech-to-text module could be implemented by the medical-support system to convert the speech from a phone call to text, which can then be analyzed to derive the information about the medical situation. Information related to a medical situation may also be provided via text, such as via a text message or a message that is generated via an application on the remote device.

In some embodiments, the medical-support system may obtain information from image data that is captured at the scene of a medical situation, which may then be used to determine what the particular medical situation is. Such image data may be captured by and/or sent from a remote device at the scene of the medical situation. In particular, a notifier may use the camera of their mobile phone to capture and send video and/or still images to the medical-support system, possibly in real-time. As examples, a bystander may capture an image or video of an injured limb, or possibly even video of an accident taking place, and such image data to the medical-support system. Other examples are possible.

In some embodiments, the information provided by the notifier may include other types of data. For example, a remote device may include an application for reporting a medical situation and/or requesting medical support. Such an application may provide a UI with features that allow a user of the remote device to quickly provide information relating to a medical situation. For instance, a user could hit a button to indicate what type of medical situation they believe to be occurring, select checkboxes from a symptoms checklist to indicate observed symptoms, and so on. Further, such an application may allow the user to initiate a communication to relay data indicating the provided information to a medical-support system. Other examples are also possible.

In some embodiments, the information provided by the notifier can be used in combination with other information that is known or accessible to the medical-support system. As an example, consider a scenario where a notifier, who is at the beach on a 100-degree day, calls the medical-support system from their mobile phone and says, "someone here just collapsed!" The medical-support system may then determine the location of the mobile phone, use enhanced mapping data to determine that the mobile phone's location is at a beach, and look up the current temperature at the determined location. Then, using the notifier's spoken information, together with the local temperature and the fact that location information corresponds to a beach, the medical-support system may deduce that the medical situation is likely to be heat exhaustion or a related condition.

In the embodiments described above, block 1002 involves the medical-support system using various types of information to actively determining what the particular medical situation is likely to be. As another example, and referring to FIG. 8, when a remote device 806 contacts an operator at an access system 802 to report a medical situation, the access system may automatically extract and analyze information from the communication to identify what the medical situation is, or determine a list of possible medical situations based on the available information. The access system 802 may then display an indication of the identified medical situation or the list of possible medical situations, so that the operator can confirm or select the medical situation they believe is occurring and, if appropriate, instruct the dispatch system (e.g., central dispatch system 808) to send a UAV. Alternatively, when the access system positively identifies a particular medical situation, the access system may automatically instruct the dispatch system to dispatch a UAV, without requesting authorization from an operator.

Note that in some cases, the identification of the remote medical situation could simply involve the medical-support system receiving a communication that indicates what the medical situation is. In other words, the medical-support system may identify the medical situation by passively being told what it is by a remote device or by a human operator of the medical-support system (e.g., a live operator at access system 802), for example.

G Determining the Target Location

As noted above, block 1004 of method 1000 involves a medical-support system determining a target location that corresponds to the identified medical situation. For example, when an emergency-response service is notified of a medical situation, the service will likely need to determine the general location of the person in need, so that a UAV can be deployed to assist the person.

In some embodiments, the target location may be the location of the person or persons who are likely to benefit from medical support in the given medical situation (or an estimate of such person or persons' location or locations). For example, if a person who is need of medical care places an emergency call from their own mobile phone, the target location may be determined to be or otherwise based on the location of their mobile phone. As another example, if a bystander places an emergency call from their mobile phone in order to report a medical situation that involves another person, it may be assumed or otherwise determined that the bystander is at or near the location of the other person. Accordingly, the target location may be set to (or otherwise determined from) the location of the bystander's mobile phone.

In other embodiments, the target location may be different from the location of the person or persons who are likely to benefit from medical support. For example, consider a scenario where an emergency medical technician (EMT) or paramedic is closer to the location of a person in need of medical support, but the EMT or paramedic does not have certain medical supplies that are needed for or might improve the medical care that can be provided. In this scenario, a medical-support system may dispatch a UAV to the location of the EMT or paramedic in order to deliver medical supplies to the EMT or paramedic, so that they can take them with them to the scene of the medical situation. Further, in some cases, the UAV might even be configured to deliver the medical supplies to the EMT or paramedic as they travel to the scene of the medical situation. In such case, the target location (e.g., the location of the EMT or paramedic) may be dynamically updated to reflect the movement of the EMT or paramedic as they travel to the scene.

The target location may be determined in a number of ways, and may be based on various types of location information. For instance, in some embodiments, the target location may be determined based on information that is provided by the remote device from which the indication of the medical situation was received. For example, consider a scenario where a bystander calls "911" and says "Somebody near me just collapsed!" Typically, when receiving a phone call, the police also receive location information, such as GPS coordinates, which identify the location of the remote device. This location information may then be made available to a medical-support system or otherwise accessible for purposes of determining the target location. For example, when a remote device calls to report a medical situation, an operator at an access system or an automated dispatch system could determine the location of the remote device based on such received GPS coordinates.

A medical-support system may determine and/or be provided with information that the can be used to determine the target location in other ways. For instance, in some embodiments, part or all of the process of determining the target location could be automated or, in other words, performed without a need for human intervention. To this end, the medical-support system could utilize any suitable information-recognition technique, such as, for example, voice recognition (when the notification is spoken) or character recognition (when the notification is typed), among other techniques now known or later developed. As an example, consider a scenario where a bystander calls "911" and says: "Somebody near me just collapsed! I'm at 123 Main Street, Mountain View." In this situation, an automated dispatch system could apply speech-to-text processing to analyze the bystander's words and determine the stated address therefrom.

The above techniques for determining such target locations are provided for illustrative purposes and not intended to be limiting. It should be understood that other techniques may be used to determine a target location, to which a UAV may be dispatched by a medical-support system.

H. Selecting an Unmanned Aerial Vehicle

As noted above, at block 1006 of method 1000, a medical-support system may select a UAV that is configured to provide medical support for the particular medical situation. In particular, an medical-support system may include or have access to a number of different types of UAVs, which are configured to provide medical support in various different medical scenarios. As such, different UAVs may be said to have a different "medical-support configurations." Thus, block 1006 may involve a medical-support system selecting a UAV that has a medical-support configuration that is likely to provide or assist in providing medical support for the particular medical situation.

In some cases, the medical-support configuration of a given type of UAV may include a package of one or more items that are designed to provide or assist in providing medical support for a certain medical situation. For example, a given type of UAV could include Aspirin and a defibrillator, and thus might be selected as an appropriate UAV to deploy when the medical-support system receives an indication that a heart attack or cardiac arrest is occurring or has just occurred. Many other examples are also possible.

Additionally or alternatively, the medical-support configuration of a given type of UAV may include one or more operational functions that are designed to provide or assist in medical support for the remote medical situation. For instance, a UAV may include wireless communication capabilities that allow remote medical personnel to assist those at the scene. For instance, a UAV might include in its package, a mobile phone or HMD, via which a bystander can communicate with and receive instructions from remote medical personnel, such that the bystander can be informed how to, e.g., provide care to a person who is injured or is suffering from a medical condition. As another example, a UAV may include program logic (e.g., medical support module(s) 816) that allow the UAV to perform certain diagnostic tests, in which the UAV analyzes data acquired from certain sensory systems of the UAV. Other examples are also possible.

In some embodiments, the selection of a UAV may be based, at least in part, on the particular person to whom medical support is going to be provided. For example, the medical-support system may determine that a particular user-account is associated with the medical situation. The medical-support system may then determine a service level for the particular user-account, and use the service level as a basis to select the UAV.

For example, there may be several UAVs that could be deployed to provide medical support in a particular medical situation. However, for various reasons, a particular one of the UAVs may only be deployed to someone who was paid for or otherwise is entitled to a higher service level. Accordingly, the particular UAV may only be selected if a person involved in the medical situation is authorized for the higher service level. Note that in some cases, the service level attributed to a particular communication may be that to which the person to whom the medical support is being provided by a UAV (e.g., the victim of an accident) is entitled. However, in other cases, the service level may be that of someone other than a person in need of medical care. For example, a family member, friend, or even a bystander to a medical situation, may have a particular service level that allows them to request medical support corresponding to the particular service level, on the behalf of another person in need.

The particular user-account may be determined in various ways. For example, a person may link their computing devices, such as their mobile phones, to a user-account for medical support. Accordingly, the medical-support system may determine an identification number for the remote device that provides the indication of the medical situation, and use the identification number to look up the associated medical-support user-account. Alternatively, the person who requests medical support may provide identification and/or log-in information, so that a medical-support user-account may be identified and/or verified by the medical-support system. Other techniques for determining the particular user-account are also possible.

In a further aspect, medical history and/or other information related to the particular person in need of medical support may be utilized to select an appropriate UAV. For example, delivery of prescription medications by non-physicians may be strictly regulated, even in emergency situations. To facilitate the verification and delivery of such medications, a medical-support system may include an opt-in registry, which includes persons' names and a list of medications for which each person has a current prescription. To facilitate diagnosis, the opt-in registry may further include a list of an individual's known medical conditions that may lead to emergency care. In practice, a given user-account may indicate such prescription-authorization information, known medical conditions, and/or other medical information for the person. Accordingly, an medical-support system may access the user-account for a person in need of medical support to determine whether or not they have a prescription for a particular medication, such that a UAV including the particular medication can be dispatched.

I. Dispatching the Selected UAV

As noted above, block 1008 of method 1000 involves a medical-support system causing the selected UAV to travel to the target location to provide medical support, as shown by block 1008. This function may be accomplished in various ways, depending upon the particular implementation.

In some embodiments, block 1008 may simply involve a component of the medical-support system sending a message to another entity to indicate that the selected UAV should be deployed. For example, if method 1000 is carried out by an access system 802, the access system may identify the medical situation, select an appropriate type of UAV, and send a message to the central dispatch system 808, which indicates that a UAV of the selected type should be dispatched to the target location. As another example, if method 1000 is carried out by a central dispatch system 808, the central dispatch system may identify the medical situation, select an appropriate type of UAV, and send a message to the local dispatch system 808 that indicates that a UAV of the selected type should be dispatched to the target location. In either case, the central dispatch system 808 may then relay the message to the appropriate local dispatch system 810, which may operate a deployment system to launch the selected UAV.

In some embodiments, block 1008 may involve one or more components of the medical-support system sending a message to instruct a deployment system to launch the selected UAV, or directly operating the deployment system to launch the selected UAV. Further, block 1008 could involve one or more components of the medical-support system preparing the selected UAV to travel to the target location, such as by determining and setting way points to allow the UAV to navigate to the target location.

VII. Conclusion

It should be understood that the systems as described above can be implemented in the form of or include program logic (i.e., program instructions) that is stored on a non-transitory computer readable medium. For instance, example systems may take the form computer software, hardware, and/or firmware, or may include such software, hardware, and/or firmware in a modular or integrated manner. Based on the disclosure and teachings provided herein, a person of ordinary skill in the art can know and appreciate other ways and/or methods using hardware, firmware, and/or software.

Further, where example embodiments involve information related to a person or a device of a person, the embodiments should be understood to include privacy controls. Such privacy controls include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. An unmanned aerial vehicle (UAV) comprising:
a housing;
a line-deployment mechanism couplable to the housing and a line, wherein the line-deployment mechanism is controllable to vary a deployment rate of the line;
a payload-release mechanism operable to couple the line to a payload, wherein the payload-release mechanism is configured to release the payload from the line; and
a control system configured to determine that the UAV is located at or near a delivery location and responsively:
operate the line-deployment mechanism according to a pre-determined variable deployment-rate profile to lower the payload to or near to the ground, wherein the variable deployment-rate profile specifies for the payload to initially descend at a pre-determined first rate and subsequently, during the descent, to decrease in speed from the first rate to a pre-determined second rate; and
subsequently determine that the payload is touching or is within a threshold distance from the ground, and responsively stop deployment of the line by the line-deployment mechanism and operate the payload-release mechanism to release the payload from the line.

2. The UAV of claim 1, wherein the line-deployment mechanism is operable to secure the line during a flight to a delivery location, such that the payload is held at or near the housing during the flight.

3. The UAV of claim 1, wherein, before lowering the payload, the control system is configured to determine the variable deployment-rate profile based on one or more of (a) height, (b) wind, (c) environmental factors, and/or (d) payload characteristics.

4. The UAV of claim 3, wherein the determined variable deployment-rate profile indicates a gradual variation in deployment rate such that the implementation of the determined variable deployment-rate profile causes the payload to start a descent at a higher speed, and to gradually decrease in speed during the descent.

5. The UAV of claim 1, wherein the determined variable deployment-rate profile indicates a one or more distances and a deployment rate corresponding to each indicated distance.

6. The UAV of claim 1, wherein the UAV further comprises a line-tension sensor, and wherein the control system is configured to:
determine a measure of tension on the line based on data from the line-tension sensor; and
determine that the payload is touching the ground based at least in part on determination that the measure of tension on the line is less than a threshold.

7. The UAV of claim 1, wherein the payload comprises at least one proximity sensor arranged on the payload so as to provide data that is indicative of a distance between the payload and the ground, and wherein the control system is configured to:
determine that the payload is touching the ground based at least in part on the data provided by the at least one proximity sensor.

8. The UAV of claim 1, wherein the control system is disposed within the housing.

9. The UAV of claim 1, wherein the control system is at least partially disposed within the payload.

10. The UAV of claim 1, wherein the line-deployment mechanism comprises a motorized braking system.

11. The UAV of claim 1, wherein the line-deployment mechanism comprises one or more friction pads.

12. A method comprising:
determining, by a computing system, a variable deployment-rate profile for deployment of a payload from an unmanned aerial vehicle (UAV), wherein a line couples the payload to the UAV;

after the variable deployment-rate profile being determined, the computing system causing a line-deployment mechanism to automatically operate according to the determined variable deployment-rate profile to lower the payload towards the ground, wherein the variable deployment-rate profile specifies for the payload to initially descend at a first rate and subsequently, during the descent, to decrease in speed from the first rate to continue descent at a second rate;

detecting, by the computing system, at least one release indication that indicates that the payload is at or near to the ground; and in response to detecting the at least one release indication, the computing system stopping deployment of the line by the line-deployment mechanism and causing the payload to be released from the line.

13. The method of claim 12, wherein determining the variable deployment-rate profile comprises determining two or more deployment rates and a corresponding line length for each deployment rate, wherein each friction level indicates how much friction should be applied to the line when the line has been deployed to the corresponding line length.

14. The method of claim 13, wherein each deployment rate corresponds to an amount of friction to be applied to the line by the line-deployment mechanism.

15. The method of claim 12, wherein determining the variable deployment-rate profile comprises determining the variable deployment-rate profile based on one or more of (a) a height of the UAV, (b) wind data, (c) environmental data, and/or (d) payload characteristics.

16. The method of claim 12, wherein detecting the at least one release indication that the payload has been lowered to a release point comprises determining that the payload is touching the ground.

17. The method of claim 12, wherein detecting the at least one release indication comprises determining that the payload is within a threshold distance from the ground.

18. The method of claim 12, wherein determining the variable deployment-rate profile further comprises determining at least one hovering height for the UAV.

19. A non-transitory computer readable medium having stored therein instructions executable by a computing device to cause the computing device to perform functions comprising:

determining, by a computing system, a variable deployment-rate profile for deployment of a payload from an unmanned aerial vehicle (UAV), wherein a line couples the payload to the UAV;

after the variable deployment-rate profile being determined, the computing system causing a line-deployment mechanism to automatically operate according to the determined variable deployment-rate profile to lower the payload towards the ground, wherein the variable deployment-rate profile specifies for the payload to initially descend at a first rate and subsequently, during the descent, to decrease in speed from the first rate to continue descent at a second rate;

detecting, by the computing system, at least one release indication that indicates that the payload is at or near to the ground; and in response to detecting the at least one release indication, the computing system stopping deployment of the line by the line-deployment mechanism and causing the payload to be released from the line.

20. The non-transitory computer readable medium of claim 19, wherein determining the variable deployment-rate profile comprises determining two or more deployment rates and a corresponding line length for each deployment rate, wherein each friction level indicates how much friction should be applied to the line when the line has been deployed to the corresponding line length.

* * * * *